(12) United States Patent
Sakuda et al.

(10) Patent No.: US 7,814,480 B2
(45) Date of Patent: Oct. 12, 2010

(54) CONTROL SOFTWARE UPDATING TECHNIQUE FOR A NETWORK APPARATUS

(75) Inventors: Kenji Sakuda, Nagano-ken (JP); Yasuhiro Oshima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1061 days.

(21) Appl. No.: 11/514,616

(22) Filed: Sep. 1, 2006

(65) Prior Publication Data
US 2007/0055970 A1    Mar. 8, 2007

(30) Foreign Application Priority Data

Sep. 5, 2005  (JP) .............................. 2005-256230
Sep. 15, 2005 (JP) .............................. 2005-268460

(51) Int. Cl.
*G06F 9/44*   (2006.01)
*G06F 9/45*   (2006.01)

(52) U.S. Cl. ...................... 717/173; 717/174; 709/203

(58) Field of Classification Search ......... 717/168–177; 709/203–204
See application file for complete search history.

(56) References Cited

U.S. PATENT DOCUMENTS

| | | | | |
|---|---|---|---|---|
| 5,761,380 A | * | 6/1998 | Lewis et al. ................... 706/47 |
| 5,930,513 A | * | 7/1999 | Taylor ........................ 717/174 |
| 6,266,810 B1 | * | 7/2001 | Tanaka et al. ................ 717/173 |
| 6,425,126 B1 | * | 7/2002 | Branson et al. ............. 717/168 |
| 6,493,871 B1 | * | 12/2002 | McGuire et al. ............ 717/173 |
| 6,658,455 B1 | * | 12/2003 | Weinman, Jr. .............. 709/203 |
| 6,675,382 B1 | * | 1/2004 | Foster ........................ 717/177 |
| 6,687,901 B1 | * | 2/2004 | Imamatsu ................... 717/173 |
| 6,931,637 B2 | * | 8/2005 | Lee et al. .................... 717/168 |
| 6,938,109 B1 | * | 8/2005 | Sliger et al. .................. 710/68 |
| 7,055,149 B2 | * | 5/2006 | Birkholz et al. ............ 717/172 |
| 7,188,342 B2 | * | 3/2007 | DeMello et al. ............ 717/173 |

(Continued)

FOREIGN PATENT DOCUMENTS

EP           1353269         10/2003

(Continued)

OTHER PUBLICATIONS

Neamtiu et al, "Contextual effects for version consistent dynamic software updating and safe concurrent programming", ACM POPL, pp. 37-49, 2007.*

(Continued)

*Primary Examiner*—Anil Khatri
(74) *Attorney, Agent, or Firm*—Nutter McClennen & Fish LLP; John J. Penny, V

(57) ABSTRACT

A network apparatus has first and second controllers that are coupled via communication channel, and is coupled to a network by the first controller. In order to update the firmware of this first controller, the first controller obtains update data for updating via the network and transfers the obtained data to the second controller. The second controller stores the update data transferred from the first controller in a storage device incorporated in the second controller. After the entirety of the update data has been stored in the storage device by the second controller, the second controller transfers the update data to the first controller. The first controller updates the firmware for the first controller using the update data transferred from the second controller.

19 Claims, 29 Drawing Sheets

U.S. PATENT DOCUMENTS

| | | | |
|---|---|---|---|
| 7,203,723 B2 * | 4/2007 | Ogawa | 709/203 |
| 7,216,343 B2 * | 5/2007 | Das et al. | 717/168 |
| 7,328,434 B2 * | 2/2008 | Swanson et al. | 717/168 |
| 7,356,577 B2 * | 4/2008 | Collins | 709/221 |
| 7,437,721 B2 * | 10/2008 | Watson et al. | 717/168 |
| 7,478,385 B2 * | 1/2009 | Sierer et al. | 717/174 |
| 7,516,450 B2 * | 4/2009 | Ogura | 717/168 |
| 7,552,431 B2 * | 6/2009 | Napier et al. | 717/169 |
| 7,555,657 B2 * | 6/2009 | Nasu | 713/191 |
| 7,653,687 B2 * | 1/2010 | Reisman | 709/203 |
| 2002/0170051 A1 | 11/2002 | Watanabe et al. | |
| 2004/0015941 A1 | 1/2004 | Sekine | |

FOREIGN PATENT DOCUMENTS

| | | |
|---|---|---|
| JP | 2000-181718 | 6/2000 |
| JP | 2002-244874 A | 8/2002 |
| JP | 2003-067171 A | 3/2003 |
| JP | 2004-005454 | 1/2004 |
| JP | 2004-126876 A | 4/2004 |
| JP | 2004-235902 A | 8/2004 |

OTHER PUBLICATIONS

Hicks et al, "Dynamic software updating", ACM Trans. on Prog. Lang. and Sys. vol. 27, No. 6, pp. 1049-1096, 2005.*
Brown et al, "A new model for updating software in wireless sensor networks", IEEE, pp. 42-47, 2006.*
Neamtiu et al, "Safe and timely dynamic updates for multi threaded programs", ACM PLDI, pp. 13-24, 2009.*
Symborski, "Updating software and configuration data in a distributed communications network", IEEE, pp. 331-338, 1988.*
Adi et al, "Secured mobile device software update over IP networks", IEEE, pp. 3-6, 2004.*
European Search Report dated Jan. 4, 2007.

* cited by examiner

USB INTERFACE/ENDPOINT CONFIGURATION

LOGICAL CHANNEL CONFIGURATION

Fig.6

| LOGICAL CHANNEL | TRANSFER DIRECTION | BODY PORTION DATA CONTENTS |
|---|---|---|
| PRINT-DATA CHANNEL(CH#11) | N → D | PRINT DATA |
| PRINT-STATUS CHANNEL(CH#12) | N ← D | PRINT ENGINE STATUS |
| LOCAL-CONTROL CHANNEL(CH#21) | N → D | CONTROL COMMANDS AND PARAMETERS REQUESTING PROCESSING |
| LOCAL-EVENT CHANNEL(CH#22) | N ← D | CONTROL COMMANDS AND PARAMETERS REQUESTING PROCESSING |
| UP-PRESENTATION CHANNEL(CH#23) | N ← D | HTML DATA |
| DOWN-PRESENTATION CHANNEL(CH#24) | N → D | HTML DATA |
| DOWN-CONTENT CHANNEL(CH#25) | N → D | DATA |

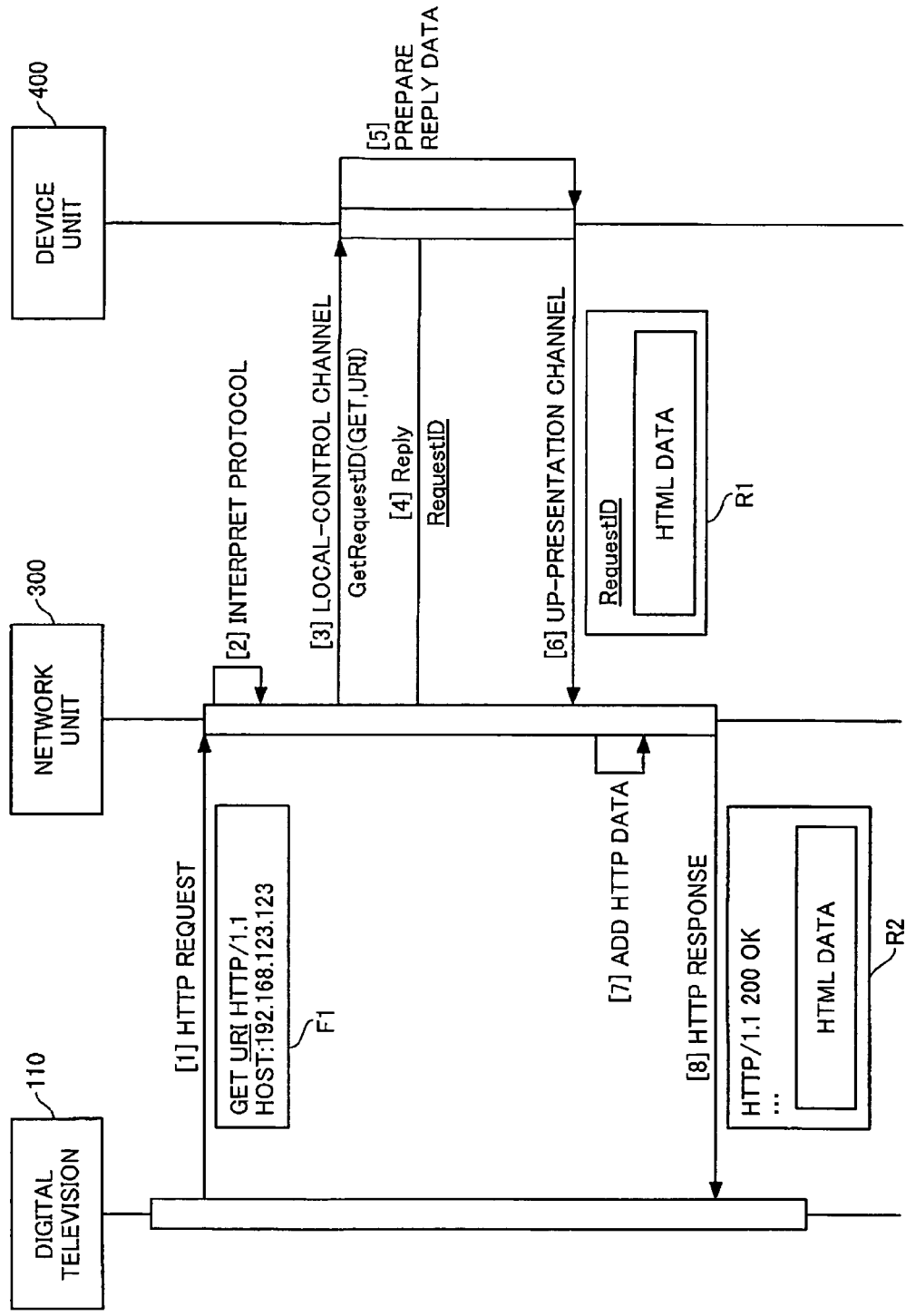

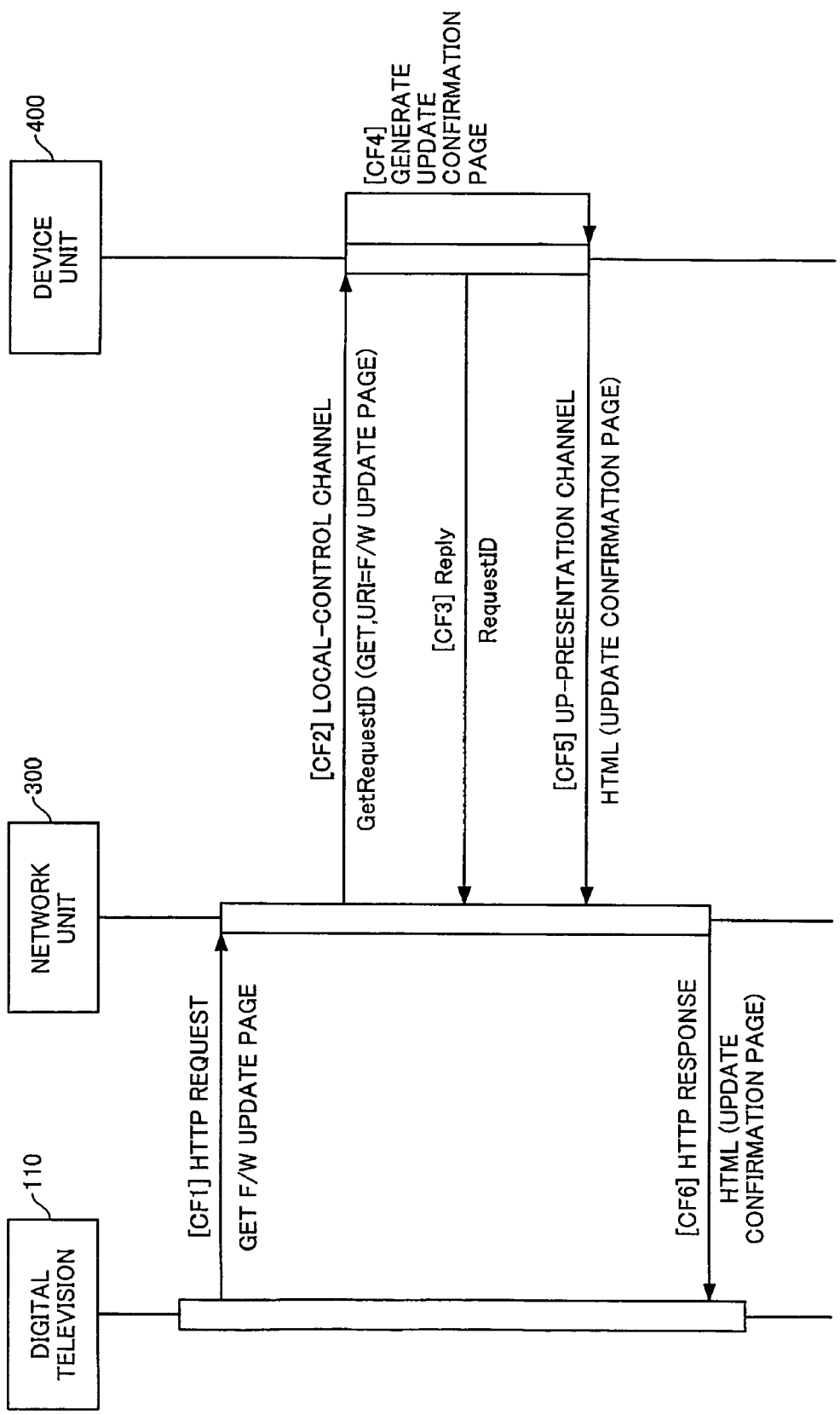

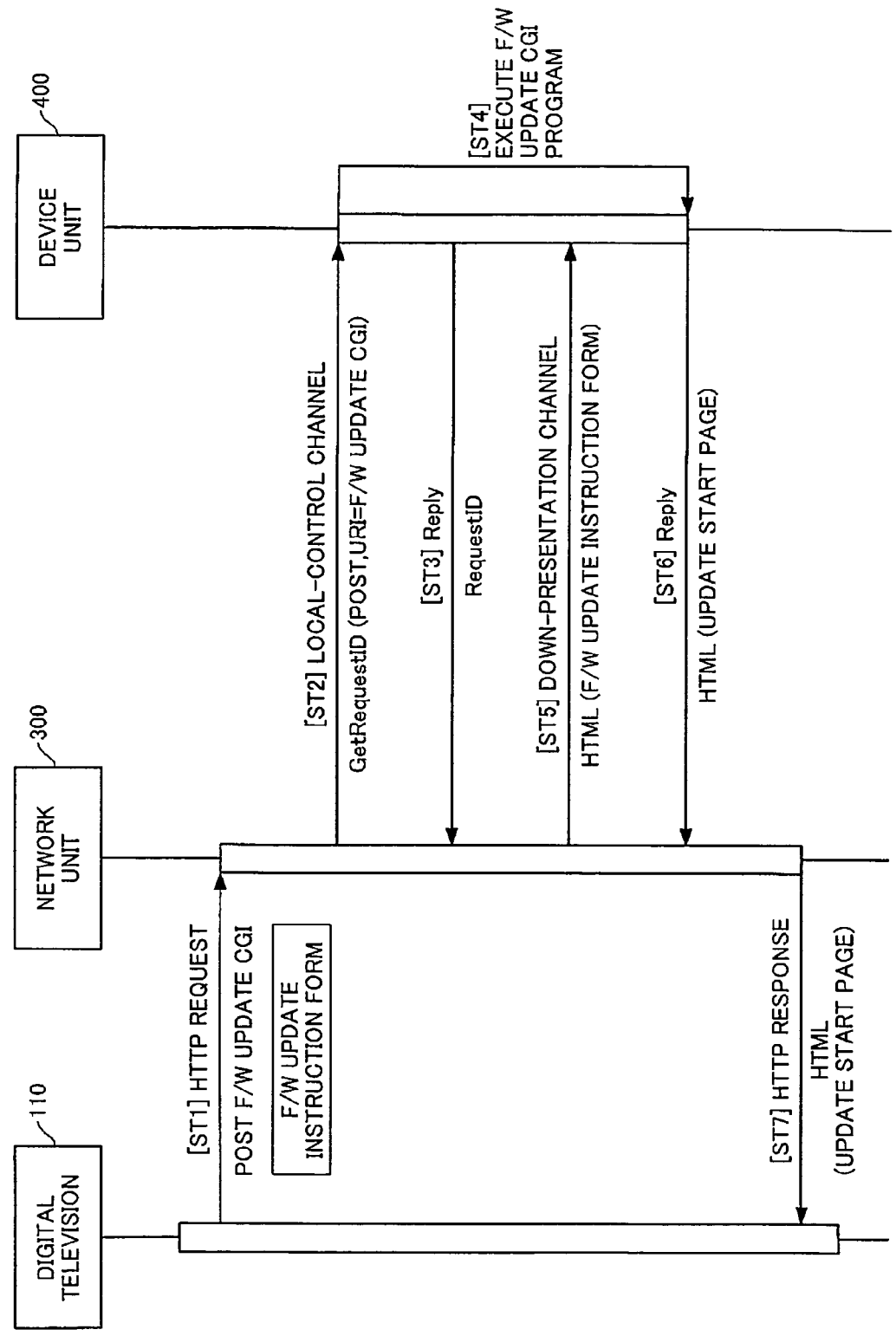

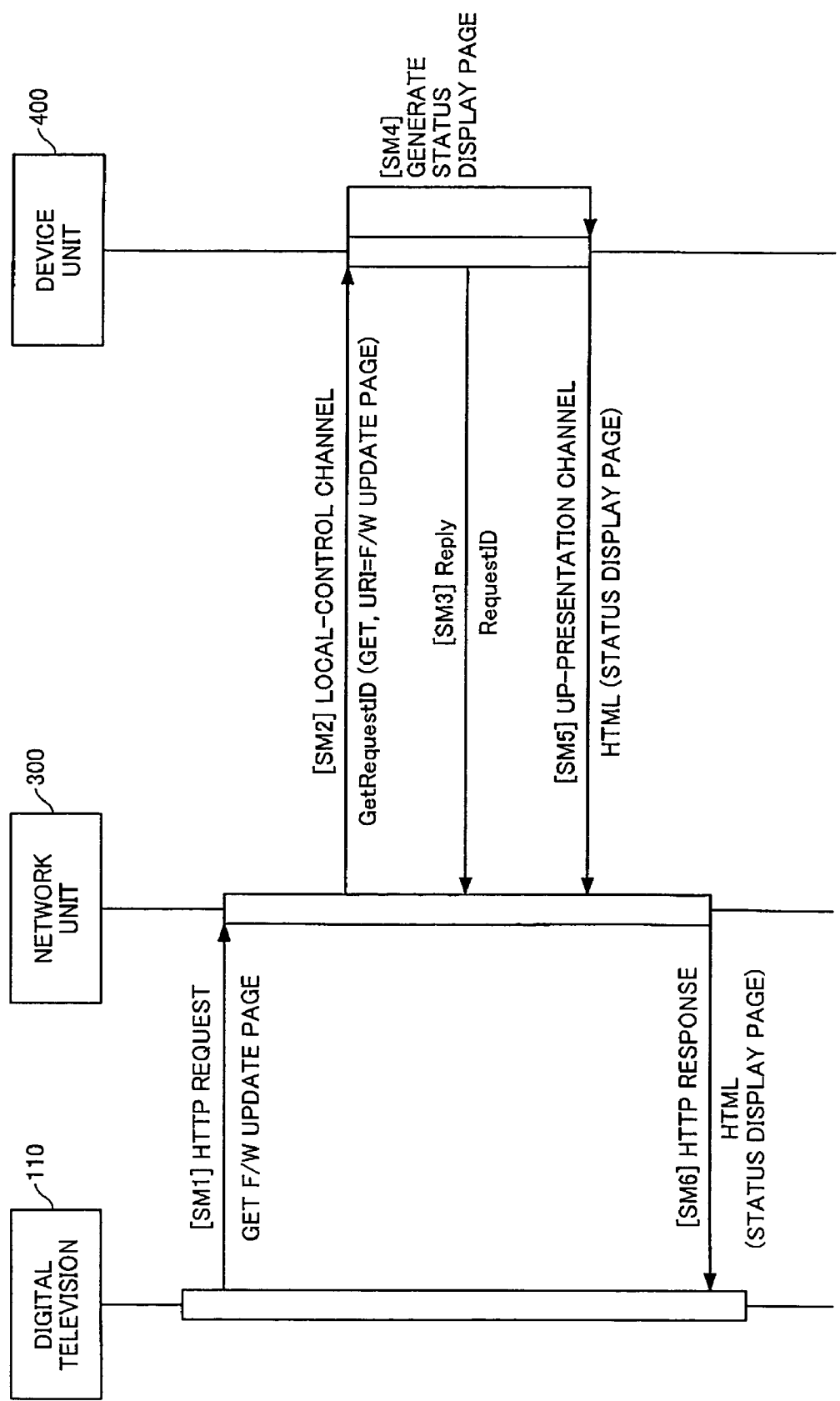

WHERE CONNECTION IMPOSSIBLE

WHILE DOWNLOADING IS IN PROGRESS

DOWNLOADING COMPLETED

FOURTH EMBODIMENT (POWER-SYNCHRONOUS UPDATE MODE)

FIFTH EMBODIMENT

CONTROL SOFTWARE UPDATING TECHNIQUE FOR A NETWORK APPARATUS

CROSS-REFERENCE TO RELATED APPLICATIONS

The present application claims the priority based on Japanese Patent Application No. 2005-256230 filed on Sep. 5, 2005 and Japanese Patent Application No. 2005-268460 filed on Sep. 15, 2005, the disclosures of which are hereby incorporated herein by reference in its entirety.

BACKGROUND OF THE INVENTION

1. Field of the Invention

The present invention relates to a technique for updating control software of a network apparatus.

2. Description of the Related Art

In a certain network apparatus such as a network printer or a network compatible multifunctional printer (hereinafter abbreviated an "MFP") which performs scanning, printing and copying, a controller that realizes the functions of the printer or the MFP and a controller that executes network-related processing are disposed separately. These controllers are interconnected via a communication channel. In general the functions of these controllers are realized with the execution of control software (i.e., a computer program) stored in a ROM installed in each controller by a CPU disposed in each controller. This control software (generally termed "firmware") is sometimes updated in order to improve the function of the respective controllers, for example.

By the way, there is a risk that the firmware do not function as a firmware when only a part is updated, and that the network apparatus may not be able to start. To avoid the risk, where the firmware is to be updated, data of entire firmware used for updating (called "firmware image") is generated and the firmware is updated using the generated firmware image.

However, during firmware updating, in order to write the firmware image to an electrically-programmable ROM (EPROM), the firmware image is stored temporarily in the RAM of each controller. Therefore, the RAM storage capacity required by each controller in order to store the firmware image may need to be larger than the storage capacity that is required to implement the functions of each controller.

SUMMARY OF THE INVENTION

An object of the present invention is to provide a technology that reduces the increase in memory device storage capacity required for control software updating.

According to an aspect of the present invention, a control software update method for updating control software for a network apparatus is provided. The network apparatus has a first controller and a second controller that are coupled via a communication channel. The first controller performs control with first control software and the second controller performs control with second control software. The network apparatus is coupled to a network via the first controller. The control software update method includes the steps of: (a) the first controller obtaining first control software update data for updating the first control software via the network and transferring the obtained first control software update data to the second controller via the communication channel; (b) the second controller storing the first control software update data transferred from the first controller in a storage device in the second controller; (c) after the entirety of the first control software update data is stored in the storage device by the second controller, the second controller transferring the first control software update data to the first controller via the communication channel; and (d) the first controller updating the first control software with the first control software update data transferred from the second controller.

According to this arrangement, the entirety of the control software update data is stored in the storage device of the second controller. Therefore, the increase of capacity of the storage device of the first controller for storing the entirety of the control software update data is reduced.

The present invention can be implemented in any of various ways, and may be realized in the form of a network apparatus, a network apparatus firmware update device and method, a computer program that implements the functions of these devices or methods, a recording medium on which such computer program is recorded, a data signal encoded in a carrier wave that includes such computer program, or in some other form.

These and other objects, features, aspects, and advantages of the present invention will become more apparent from the following detailed description of the preferred embodiments with the accompanying drawings.

BRIEF DESCRIPTION OF THE DRAWINGS

FIG. 6 is a table showing the information stored in the body section of the D4 packet transferred using the various logical channels.

FIG. 7 is a sequence diagram of data transfer process executed by the network unit 300 as an example.

FIG. 9 is a sequence diagram of the processing performed when the digital television 110 sends the network unit 300 of the MFP 200 an HTTP request that demands transmission of a page by which to update the firmware.

FIG. 10 is a sequence diagram of the process performed when the digital television 110 sends an instruction to start firmware updating as an HTTP request to the network unit 300 of the MFP 200.

FIG. 11 is a sequence diagram that the browser of the digital television 110 gets the firmware update page periodically in response to the instruction included in the update start page.

FIG. 20 is an explanatory drawing showing an example of a Web page provided by the HTTP server module 10520a.

DESCRIPTION OF THE PREFERRED EMBODIMENT

Figure 1:
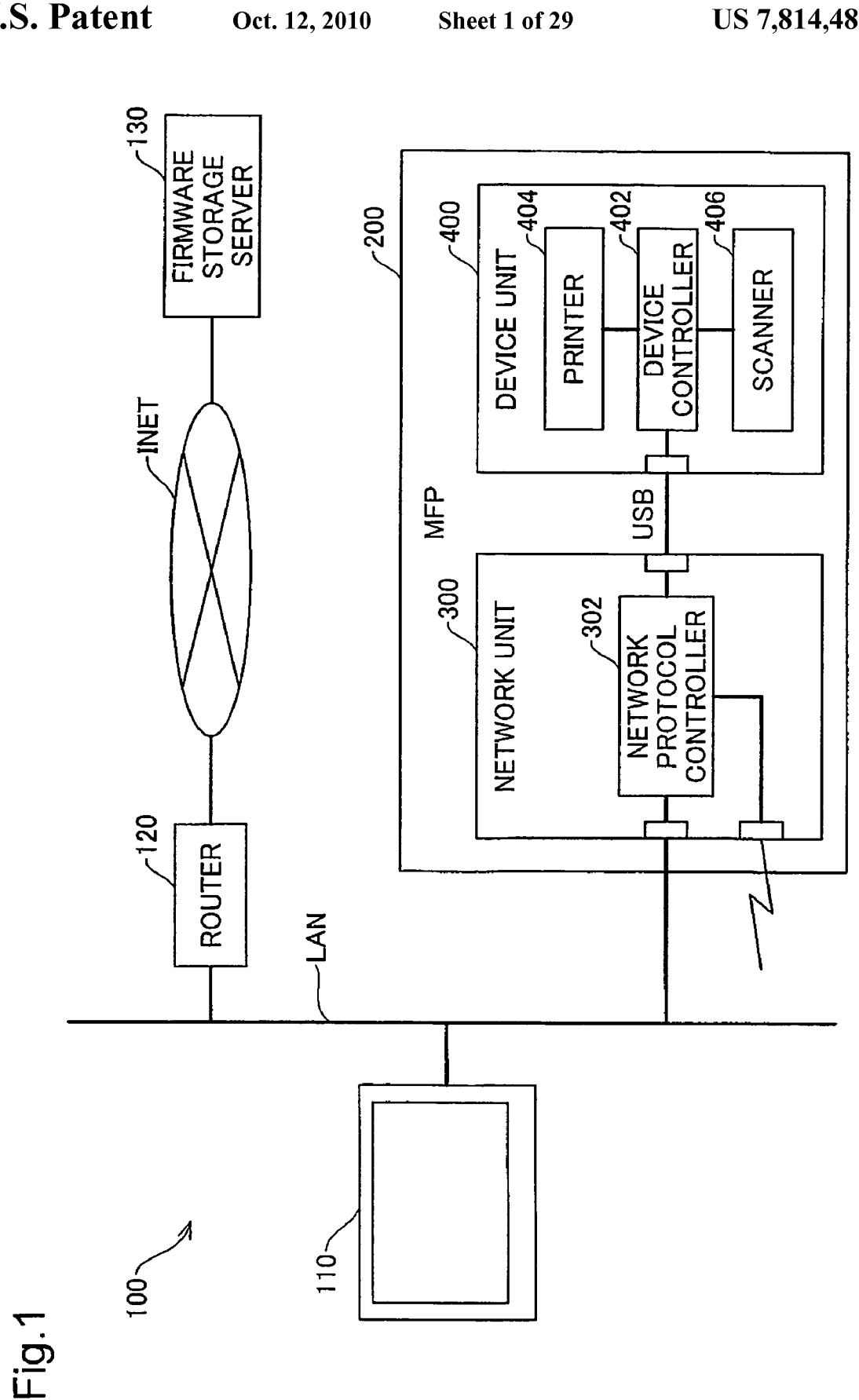
FIG. 1 is an explanatory drawing showing the configuration of a network system 100 as an embodiment of the present invention.

Embodiments of the present invention will be described below in the following sequence:
A. First Embodiment
  A1. System summary
  A2. Configuration of MFP
  A3. Firmware updating
B. Second Embodiment
C. Third Embodiment
D. Fourth Embodiment
E. Fifth Embodiment
F. Variations A1. System Summary FIG. 1 is an explanatory drawing showing the configuration of a network system 100 as an embodiment of the present invention. The network system 100 has a configuration in which a digital television 110, a router 120 and an MFP 200 are interconnected over a local area network (LAN). The LAN-connected router 120 is connected to a firmware storage server 130 over the Internet INET. The LAN may be a wired network operating under the IEEE 802.3 standard or a wireless network operating under the IEEE 802.11 b/g/a standard.

The digital television 110 has a function to get HTML data described in HyperText Markup Language (HTML) over the LAN and display Web pages expressed using this HTML data using a browser.

The MFP 200 has a network unit 300 and a device unit 400. The network unit 300 functions as a network protocol controller 302 that mediates messages exchanged between the device unit 400 and other devices on the LAN.

The network unit 300 has the functions of both an HyperText Transfer Protocol (HTTP) server and an HTTP client. As described below, the network unit 300 interprets the headers of HTTP-based messages transferred from the LAN, transfers the messages to the device unit 400. The network unit 300 adds a header to the messages transferred from the device unit 400, and transfers the messages to the LAN also. The network unit 300 is a sort of controller that executes various network control processing.

The device unit 400 includes a printer 404 and a scanner 406 as service devices. The device unit also includes a device controller 402 that controls the printer 404 and the scanner 406. A service device other than the printer 404 and the scanner 406 can be added. The device unit 400 may have the printer 404, scanner 406 and another service device independently. The network unit 300 and device unit 400 are interconnected via Universal Serial Bus (USB). A logical interface other than USB may also be used to connect the two devices. The device unit 400 is a sort of controller that executes the main functions of the MFP 200, such as the printer 404 and the scanner 406.

Each of the digital television 110 and MFP 200 may be configured as a network apparatus that is compatible with Universal Plug and Play (UPnP, a trademark of UPnP Implementer's Corporation). In this case, network unit 300 of the MFP 200 interprets messages of various network protocols used by UPnP and transfer the messages to the device unit 400. This enables the MFP 200 to provide various UPnP-compatible functions to the digital television 110.

Where the digital television 110 and the MFP 200 are UPnP-compatible devices, the digital television 110 can obtain a presentation page of the MFP 200 which is HTML data by using the UPnP functions. A user interface for entering various setting of the MFP 200 may be displayed on the browser of the digital television 110. When this presentation page is displayed on the browser of the digital television 110, a user interface for entering various settings of the MFP 200 is displayed.

In UPnP, a network apparatus that executes services such as printing and image scanning in response to an external request may be termed a "service device" or simply a "device". A network apparatus that uses a service provided by a service device may be called a "control point". In the network system 100 shown in FIG. 1, where the digital television 110 and MFP 200 are configured as UPnP-compatible network apparatuses, the printer 404 and scanner 406 incorporated in the MFP 200 are corresponding to "devices", and the digital television 110 is corresponding to a "control point".

In the firmware storage server 130, firmware data (control software update data) used for updating of control software (firmware) in the MFP 200 is stored. Updating of the firmware in the MFP 200 will be described later. The firmware storage server 130 provides the firmware data stored in the firmware storage server 130 via the Internet INET. The firmware data is supplied based on the HTTP in response to a request issued to the HTTP server of the firmware storage server 130, which demands transmission of the firmware data. In the first embodiment, the firmware storage server 130 transmits the firmware based on HTTP, but the firmware may be transmitted using File Transfer Protocol (FTP) or some other protocol.

A2. Configuration of MFP

Figure 2:
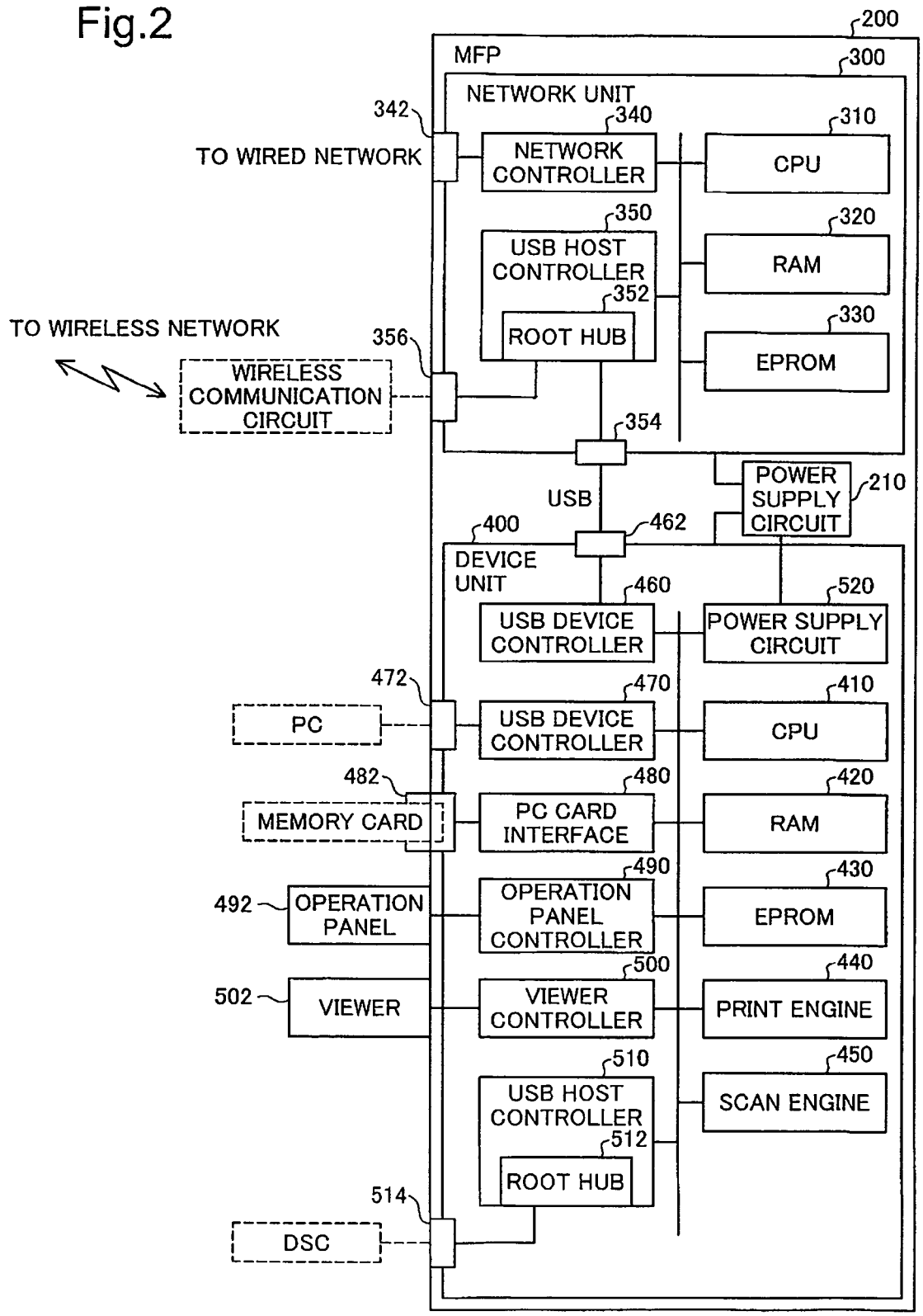
FIG. 2 is a block diagram showing the internal configuration of the MFP 200.

FIG. 2 is a block diagram showing the internal configuration of the MFP 200. The MFP 200 includes the network unit 300, the device unit 400, and a power supply circuit 210. The power supply circuit 210 provides power to the network unit 300 and the device unit 400.

The network unit 300 has a central processing unit (CPU) 310, a RAM 302, an electrically-programmable ROM (EPROM) 330, a network controller 340, and a USB host controller 350. The firmware for the network unit 300 is stored in the EPROM 330. This firmware is transferred to the RAM 320 by the CPU 310 when the MFP 200 is started up. The CPU 310 achieves various functions for network unit 300 by executing the firmware transferred to the RAM 320. Any electrically-rewritable EPROM such as a flash memory may be used as the EPROM 330.

The network controller 340 is connected to a wired network through a connector 342. The USB host controller 350 has a root hub 352. Two USB connectors 354, 356 are disposed on the root hub 352. The first USB connector 354 is connected to the USB connector 462 of the device unit 400 with a USB cable. An additional device, such as a wireless communication circuit for communicating with a wireless LAN network or other device unit, can be connected to the second USB connector 356.

The device unit 400 has a CPU 410, a RAM 420, an EPROM 430, a print engine 440, a scan engine 450, two USB device controllers 460, 470, a PC card interface 480, an operation panel controller 490, a viewer controller 500, a USB host controller 510, and a power supply controller 520. The power supply controller 520 controls the power supply circuit 210. The firmware for the device unit 400 is stored in the EPROM 430. The CPU 410 achieves the various functions of the device unit 400 by executing the firmware stored in the EPROM 430. Any electrically-rewritable EPROM such as a flash memory may be used as the EPROM 430.

The print engine 440 is a printing mechanism that performs printing in accordance with received print data. The scan engine 450 is a mechanism that generates image data from scanned images. The present invention relates to firmware updating of the MFP 200, and because this processing does not affect the configuration or functions of the print engine 440 and scan engine 450, explanation of these components will be omitted.

A first USB device controller 460 of the device unit 400 is connected to the USB host controller 350 of the network unit 300 through a USB connector 462. A second USB device controller 470 has a USB connector 472 and can connected to a desired USB host such as a personal computer. The PC card interface 480 has a PC card slot 482. An operation panel 492 is connected to the operation panel controller 490 as input means. A viewer 502 is connected to the viewer controller 500 as image display means. The user can input various instructions with this operation panel 492 while observing the images and menus displayed on the viewer 502. The USB host controller 510 has a root hub 512 that incorporates a USB connector 514. Various USB devices such as a digital camera and a hard disk drive (HDD) can be connected to this connector 514.

The CPU 310 of the network unit 300, the network controller 340 and the USB host controller 350 perform the functions of the network protocol controller 302 shown in FIG. 1. Specifically, the network controller 340 sends and receives messages based on various network protocols. The CPU 310 interprets the network protocols and determines transfer recipients. The USB host controller 350 transfers messages to and from device units 400. The CPU 310, the network controller 340 and the USB host controller 350 transfer the messages without interpreting or processing the message body.

The USB device controller 460 and the CPU 410 of the device unit 400 realize the functions of the device controller 402 shown in FIG. 1. Specifically, the USB device controller 460 sends and receives messages based on the USB transfer protocol. The CPU 410 interprets the contents of messages transferred from the network unit 300, performs processing in accordance with the message contents, and operates the print engine 440 and the scan engine 450. The print engine 440 is corresponding to the printer 404 shown in FIG. 1, and the scan engine 450 corresponds to the scanner 406 shown in FIG. 1.

Figure 3:
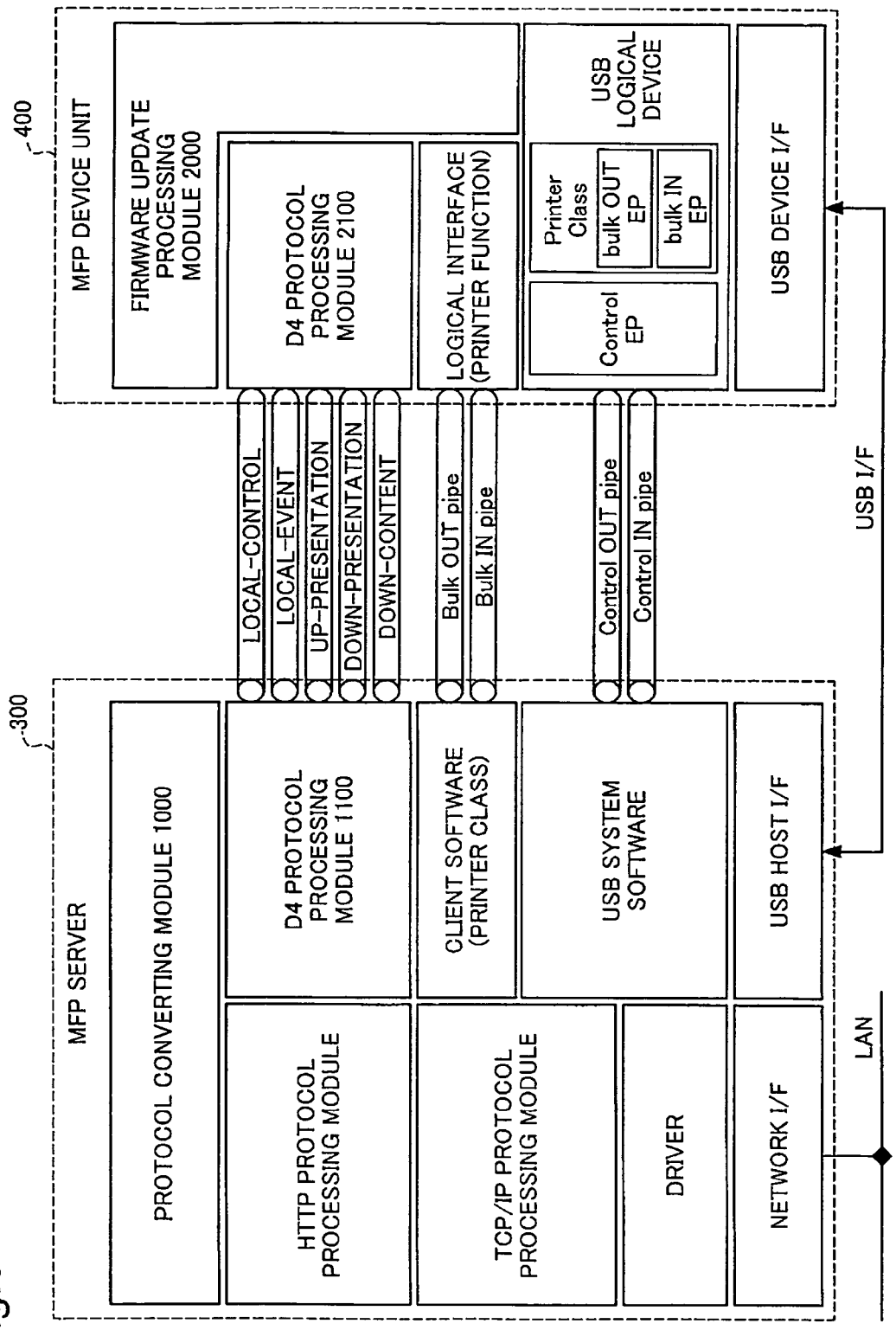
FIG. 3 is a block diagram showing the hierarchical structure of the functions related to the firmware updating of the network unit 300 and the device unit 400.

FIG. 3 is a block diagram showing the hierarchical structure of the functions related to the firmware updating of the network unit 300 and the device unit 400. The network unit 300 includes a protocol converting module 1000 that converts the HTTP as the network protocol to the D4 protocol used for communication between the network unit 300 and the device unit 400. The D4 protocol is a communication protocol defined by the IEEE 1284.4 standard that uses packets (D4 packets) for the communication.

The protocol converting module 1000 functions at the top of the hierarchy above the HTTP protocol processing module and the D4 protocol processing module 1100. Disposed below the HTTP protocol processing module in ascending order are a network interface, a driver and a TCP/IP protocol processing module. Disposed below the D4 protocol processing module in ascending order are a USB host interface (hardware), USB system software and a printer class logical interface.

The device unit 400 includes a firmware update processing module 2000 that interprets message instructing the firmware update and executes processing in accordance with the results of the interpretation of the message. Disposed below the firmware update processing module 2000 in ascending order are a USB device interface (hardware), a USB logical device, a printer class logical interface and a D4 protocol processing module 2100. The printer class logical interface is an interface that mediates between the printer class USB logical device and upper-level protocols. In the example shown in FIG. 3, the modules pertaining to the print engine 440 and the scan engine 450 is omitted.

In FIG. 3, various communication channels are indicated between the network unit 300 and the device unit 400. These channels represent logical connections between corresponding levels of the network unit 300 and the device unit 400. The five channels between the D4 protocol processing modules 1100, 2100 are logical channels implemented with USB data transfer. The USB data transfer channels will first be described below.

Figure 4A:
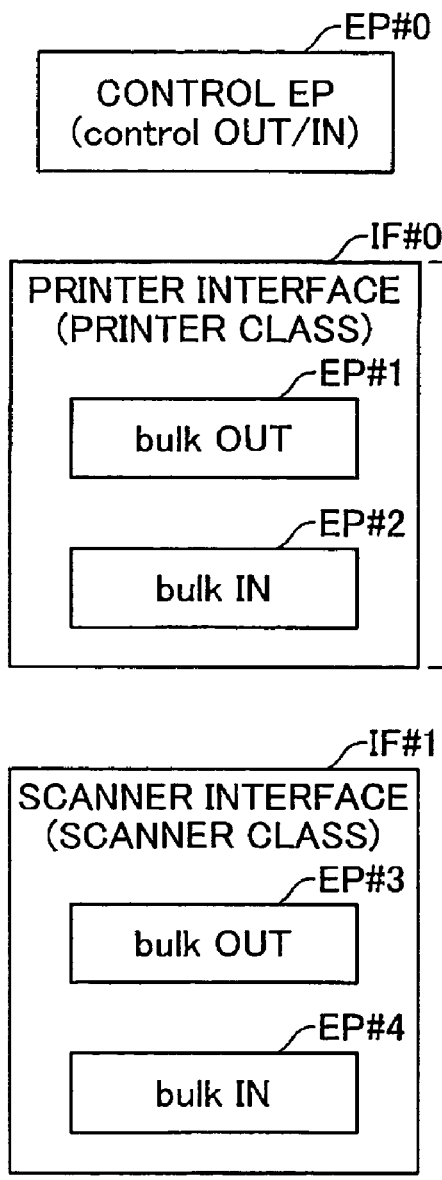
FIGS. 4A and 4B are explanatory drawings showing the USB interface/endpoint configuration and the configuration of the logical channels.
Figure 4B:
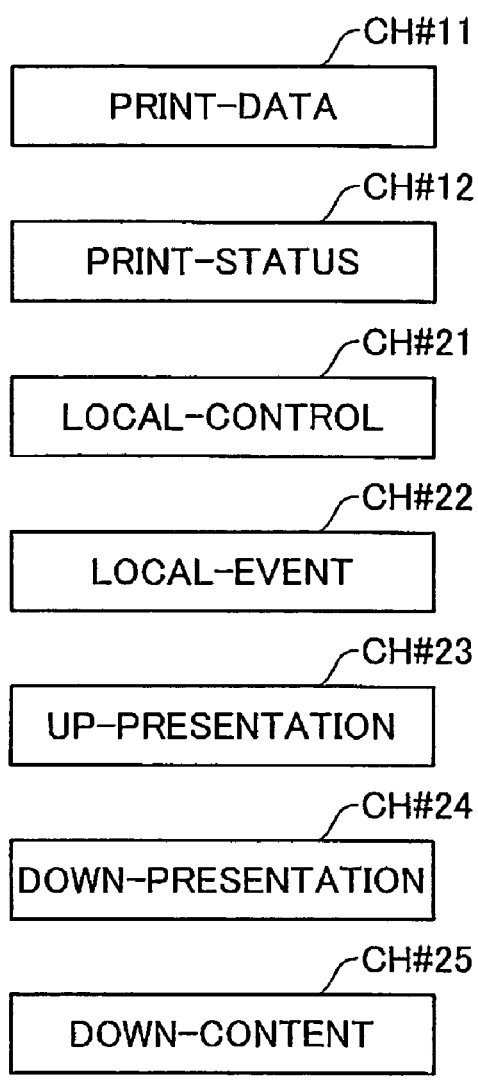

FIGS. 4A and 4B are explanatory drawings showing the USB interface/endpoint configuration and the configuration of the logical channels. In general, a USB device has an interface and an endpoint. USB data transfer is carried out between the USB host and the endpoint. In other words, the "endpoint" is the logical resource that performs communication with the host. In the example of FIG. 4A, the five endpoints EP#0~EP#4 are shown. The control endpoint EP#0 is an endpoint used for sending and receiving default device requests. A "default device request" is a basic request that must be supported by all USB devices. Therefore, a control endpoint EP#0 must be present in each USB device.

The printer bulk OUT endpoint EP#1 and printer bulk IN endpoint EP#2 are endpoints used to receive and send messages to and from the print engine 440. Similarly, the scanner bulk OUT endpoint EP#3 and scanner bulk IN endpoint EP#4 are endpoints used to receive and send messages to and from the scan engine 450. In general, in a USB device, endpoints other than the control endpoint EP#0 are classified by logical interface (termed "device class"). In the example shown in FIG. 4A, a printer interface IF#0 and a scanner interface IF#1 serve as logical interfaces.

In the first embodiment, the printer interface IF#0 includes seven logical channels, as shown in FIG. 4B. All of these logical channels can achieve bi-directional communication using the bulk OUT endpoint EP#1 and printer bulk IN endpoint EP#2. Identification information for each logical channel is recorded in a D4 packet header. The number of logical channels and classification of the logical channels are not limited to this number or these classifications.

Figure 5:
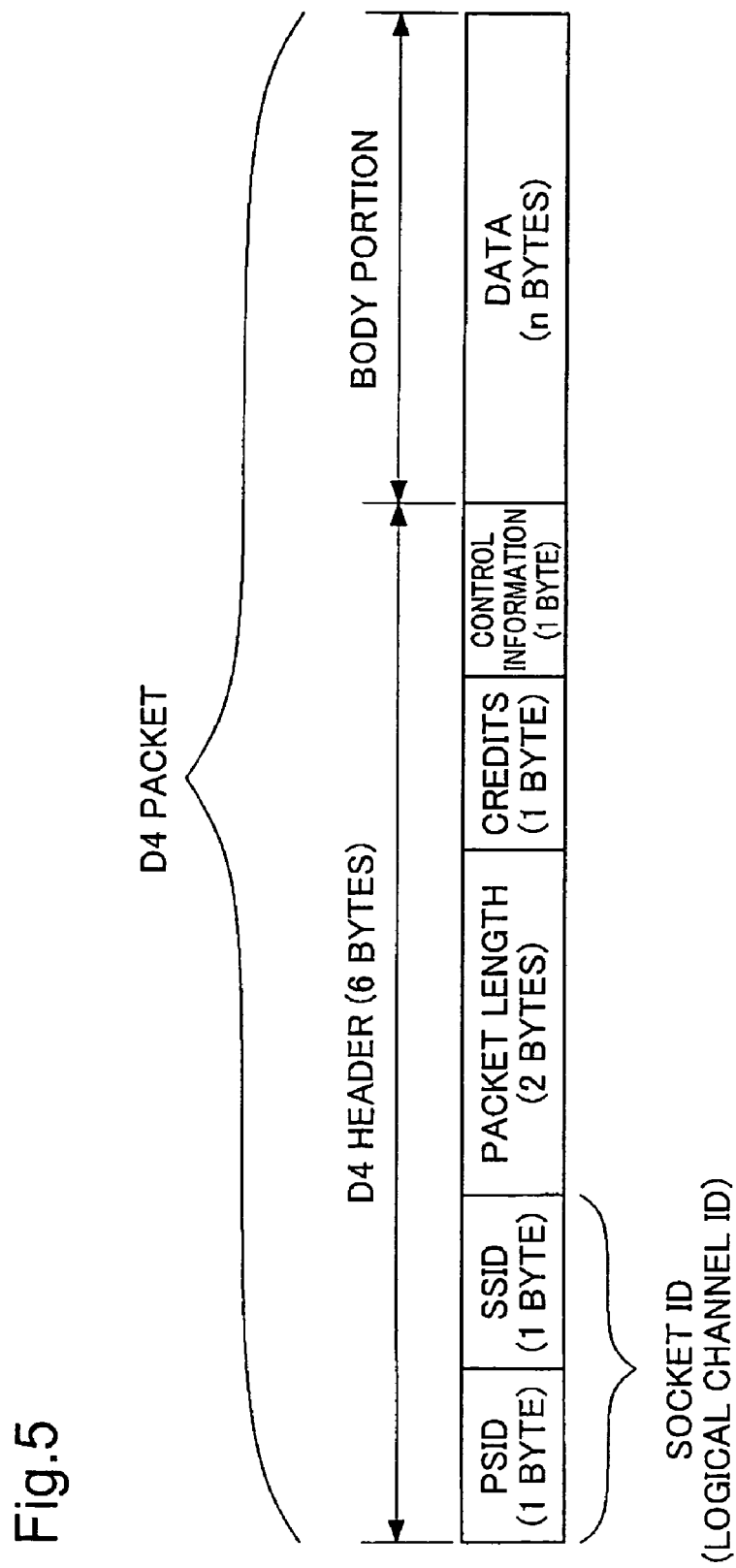
FIG. 5 is an explanatory drawing showing the structure of a D4 packet used in USB data transfer.

FIG. 5 is an explanatory drawing showing the structure of a D4 packet used in USB data transfer. A D4 packet has a 6-byte header (D4 header) and a body portion. The D4 header includes a primary socket ID (PSID), a secondary socket ID (SSID), a packet length, credits and control information. In general, the primary socket ID and the secondary socket ID are set to the same ID for identifying the logical channels shown in FIG. 4B. The entire length of the D4 packet including the D4 header is recorded as the packet length section of the D4 header. Information to execute data transfer control according to the D4 protocol is recorded in the credit and control information sections. Various type of information is stored as data in the data section of the body section of the D4 packet based on the logical channel.

FIG. 6 is a table showing the information stored in the body section of the D4 packet transferred using the various logical channels shown in FIG. 4B. The first column in the table of FIG. 6 shows the various logical channels in FIG. 4B. The second column shows the data transfer direction for each logical channel. An arrow traveling from "N" to "D" in the second column indicates that the data is transferred from the network unit 300 to the device unit 400, while an arrow traveling from "D" to "N" in the second column indicates that the data is transferred from the device unit 400 to the network unit 300. The third column in the table of FIG. 6 shows the information stored in the body section of the D4 packet transferred via the respective logical channels.

As shown in FIG. 6, control commands and associated parameters are transferred via the LOCAL-CONTROL and LOCAL-EVENT channels. HTML data is transferred via the UP-PRESENTATION and DOWN-PRESENTATION channels. These four channels are classified by data content into channels by which data is transferred from the network unit 300 to the device unit 400 (i.e., LOCAL-CONTROL channel and DOWN-PRESENTATION channel) and channels by which data is transferred from the device unit 400 to the network unit 300 (i.e., LOCAL-EVENT channel and UP-PRESENTATION channel).

The DOWN-CONTENT channel is used to transfer various data from the network unit 300 to the device unit 400. The PRINT-DATA and PRINT-STATUS channels are channels used for data transfer between the print engine 440 and the network unit 300.

FIG. 7 is a sequence diagram of data transfer process executed by the network unit 300 as an example. In the example of FIG. 7, the situation is shown in which HTML data is obtained by the digital television 110 for displaying on its browser. Here, various messages are transferred among the digital television 110, the network unit 300 and the device unit 400.

In step [1], the digital television 110 transfers an HTTP request message F1 to the network unit 300. The header of the message F1 includes a request command (using a method such as GET or POST), the Uniform Resource Identifier (URI) indicating the unique position of the HTML data to be obtained in the device unit 400, and the IP address of the MFP 200 (for example "192.168.123.123"). In this specification, an HTTP request message that includes the GET request command will be simply termed a "GET request", and the same convention will be followed for other request commands (such as POST requests). Transmission data is included in the message F1 depending on the type of HTTP request command.

In step [2], the network unit 300 interprets the request message F1. In the example of FIG. 7, by interpreting the request message F1, the network unit 300 determines that the HTTP request command is a GET request to obtain the HTML data indicated by the URI. Even if the request message F1 includes transmission data, the content of the transmission data is not interpreted.

In step [3], the network unit 300 sends the command (GetRequestID) used to obtain the request ID (RequestID) to the device unit 400 via the LOCAL-CONTROL channel. The type of HTTP request command (GET) and the URI of the HTML data to be obtained are added to the GetRequestID command. The request ID is an identification code used to identify data sent and received between the network unit 300 and the device unit 400 based on a GetRequestID command.

In step [4], the device unit 400 replies to the GetRequestID command. This reply includes a request ID used to identify the HTML data (reply data) to be sent by the device unit 400 in response to the GetRequestID command of step [3].

In step [5], the device unit 400 prepares the reply data in response to the GetRequestID command. Specifically, the device unit 400 executes various processing based on the URI which is provided as a parameter of the GetRequestID command and generates HTML data as a result.

In step [6], the device unit 400 sends a reply message R1 to the network unit 300 via the UP-PRESENTATION channel. The reply message includes the request ID indicating that the HTML data to be sent corresponds to the request transferred in step [3].

In step [7], the network unit 300 extracts the HTML data from the reply message R1. Then the network unit 300 adds an HTTP header to the extracted HTML data. This HTTP header includes a status code indicating the processing result of the HTTP request. For example, if the processing result is OK, the status code is set to "200," while if the processing resulted in error, the status code is set to "500."

In step [8], the HTTP response message R2 created in the manner described above is sent from the network unit 300 to the digital television 110.

A3. Firmware Update

Figure 8A:
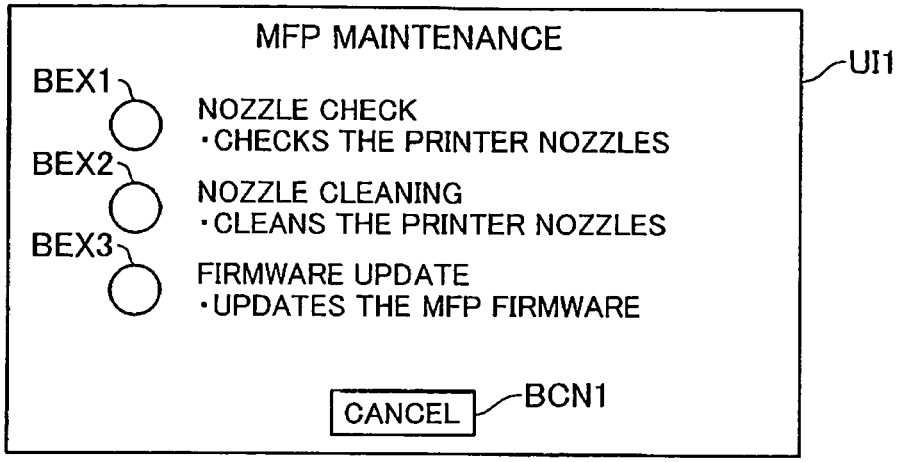
FIGS. 8A through 8C are explanatory drawings showing the viewing area displayed on the browser of the digital television 110 when the firmware of the MFP 200 is to be updated.
Figure 8B:
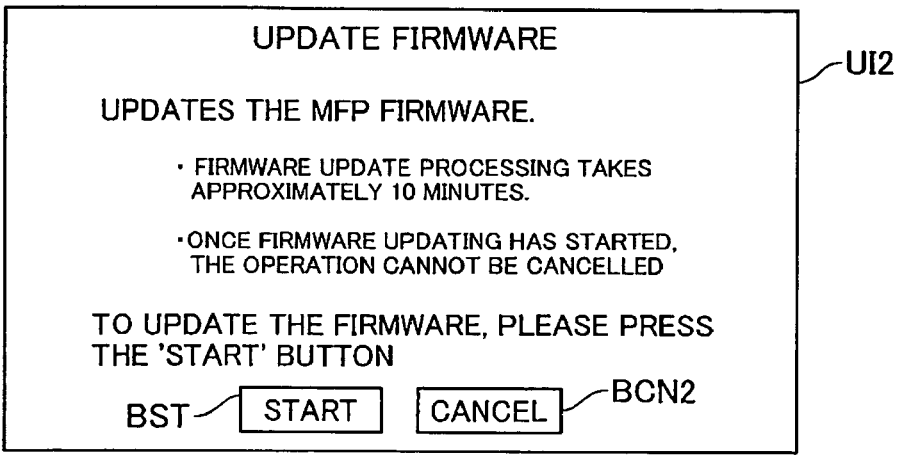
Figure 8C:
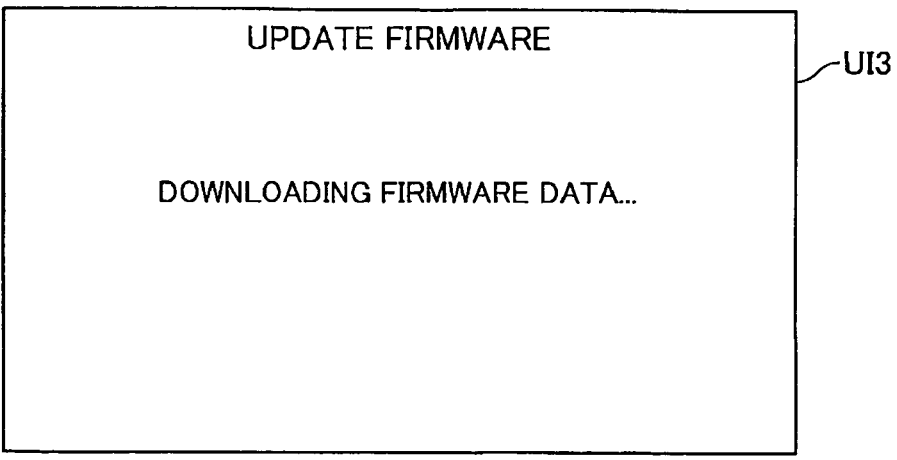

FIGS. 8A through 8C are explanatory drawings showing the viewing area displayed on the browser of the digital television 110 when the firmware of the MFP 200 is to be updated. The user can display an MFP 200 maintenance page on the browser using the browser of the digital television 110. Specifically, the digital television 110 sends a GET request requesting the transmission of HTML data expressing the maintenance page to the network unit 300. The digital television 110 displays on the browser the maintenance page expressed by the HTML data in the HTTP response returned from the network unit 300.

When the digital television 110 displays the maintenance page on the browser, a user interface for entering various settings of the MFP 200 is displayed on the browser. If both of the digital television 110 and the MFP 200 are configured as UPnP-compatible network devices, the digital television 110 can display the maintenance page on the browser using a presentation page that is notified by the MFP 200 to the control point.

FIG. 8A shows the situation in which the MFP 200 maintenance page is displayed on the browser of the digital television 110. As shown in FIG. 8A, a button BEX1 used to instruct a printer nozzle status check, a button BEX2 used to instruct printer nozzle cleaning, a button BEX3 used to instruct MFP 200 firmware updating, and a cancel button BCN1 used to instruct that maintenance process be cancelled are displayed in the user interface UI1 formed by the maintenance page.

When the user operates the button BEX1 displayed in the user interface UI1, the digital television 110 sends an HTTP request that demands transmission of a page to check the printer nozzle status to the network unit 300 of the MFP 200. The MFP 200 checks the printer nozzle status based on this HTTP request, and responds by sending a page expressing the results of the check to the digital television 110. Similarly, in response to user operation of the button BEX2, the digital television 110 sends an HTTP request that demands transmission of a page to clean the printer nozzles to the network unit 300 of the MFP 200. The MFP 200 then sends the nozzle cleaning page to the digital television 110 in response to this HTTP request.

When the user operates the button BEX3 displayed in the user interface UI1, the digital television 110 sends to the network unit 300 of the MFP 200 an HTTP request that demands transmission of a page to update the firmware.

FIG. 9 is a sequence diagram of the processing performed when the digital television 110 sends the network unit 300 of the MFP 200 an HTTP request that demands transmission of a page by which to update the firmware (F/W).

In step [CF1] the digital television 110 sends a request that demands transmission of the firmware update page to the network unit 300. Specifically, the digital television 110 sends an HTTP request message that includes the GET method expressing the request for page transmission and a URI for specifying the firmware update page to the network unit 300.

When the HTTP request is sent to the network unit 300 in step [CF1], the network unit 300 sends a GetRequestID command to the device unit 400 via the LOCAL-CONTROL channel in step [CF2]. In the example of FIG. 9, a parameter indicating that the request command is a GET request demanding transmission of HTML data and a parameter indicating the URI specifying that the HTML data for which transmission is requested is the firmware update page are added to the GetRequestID command. In response to the GetRequestID command of step [CF2], the device unit 400 issues a response that includes a request ID and sets the device unit 400 to a status in which reception of requests for processing other than firmware updating is prohibited.

In step [CF4], the device unit 400 generates the HTML data to be sent in response to the firmware update page transmission request. In the first embodiment, HTML data expressing the update confirmation page by which the user checks whether or not firmware updating should be performed is generated in step [CF4]. The HTML data expressing the update confirmation page is sent to the network unit 300 in step [CF5]. After an HTTP header is added to the HTML data expressing the update confirmation page, the network unit 300 sends a message to the digital television 110 as an HTTP response in step [CF6].

FIG. 8B shows the situation in which the update confirmation page sent to the digital television 110 in step [CF6] is displayed on the browser of the digital television 110. The user interface UI2 for confirming whether or not firmware updating should be performed is displayed on the browser of the digital television 110 with this update confirmation page.

A start button BST that instructs the start of firmware updating and a cancel button BCN that instructs the cancellation of firmware updating are displayed in the user interface UI2 shown in FIG. 8B. When the user operates the cancel button BCN, in order to display the maintenance page, the digital television 110 sends to the MFP 200 an HTTP request that demands transmission of HTML data expressing the maintenance page. As a result, the maintenance page shown in FIG. 8A is displayed on the browser of the digital television 110.

When the user operates the start button BST, the digital television 110 sends to the network unit 300 of the MFP 200 an instruction to start firmware updating. In the first embodiment, this firmware update start instruction is also sent to the network unit 300 of the MFP 200 as an HTTP request.

FIG. 10 is a sequence diagram of the process performed when the digital television 110 sends an instruction to start firmware updating as an HTTP request to the network unit 300 of the MFP 200.

In step [ST1], the digital television 110 sends a user instruction to the network unit 300. Specifically, the digital television 110 sends an HTTP POST request to the network unit 300 in order to pass the HTML data (a firmware update instruction form) including information on the user's instruction to firmware update Common Gateway Interface (CGI). This POST request includes a firmware update instruction form. The firmware update CGI is a sort of computer program that interprets user instructions and executes processing in accordance with the interpreted contents on the device unit 400.

In step [ST2], the network unit 300 sends to the device unit 400 a GetRequestID command via the LOCAL-CONTROL channel. In the example of FIG. 10, a parameter indicating that the HTTP request from the digital television 110 is a POST request and a parameter indicating the URI specifying the firmware update CGI to be executed are added to the GetRequestID command. In response to the GetRequestID command of step [ST2], the device unit 400 issues a response in step [ST3] that includes a request ID.

In step [ST4], the device unit 400 starts execution of the firmware update CGI. In step [ST5], the device unit 400 obtains the firmware update instruction form from the network unit 300. The obtained firmware update instruction form is interpreted by the firmware update CGI. Where it is determined by the interpretation that the user's instruction is to cancel firmware update, the process shown in FIG. 10 is aborted. If firmware update is cancelled, the device unit 400 sets to a status in which reception of requests for processing other than firmware updating is allowed.

Where it is determined that the user instruction is to execute firmware update, on the other hand, the process shown in FIG. 10 is continued. In this case, the device unit 400 generates an update start page to notify the user that firmware updating has started while commences process of firmware update. The update start page described in HTML includes an instruction to cause the browser to get the firmware update page periodically (once per second, for example).

In step [ST6], the device unit 400 sends to the network unit 300 the update start page which is generated in step [ST4]. In step [ST7], the network unit 300 sends the update start page to which a HTTP header was added to the digital television 110.

FIG. 8C shows the situation in which the update start page sent to the digital television 110 in step [ST7] is displayed on the browser of the digital television 110. As shown in FIG. 8C, a user interface UI3 to notify the user that firmware updating has started is displayed on the browser of the digital television 110.

FIG. 11 is a sequence diagram that the browser of the digital television 110 gets the firmware update page periodically in response to the instruction included in the update start page. The sequence shown in FIG. 11 differs from the sequence shown in FIG. 9 in that the HTML data generated by the device unit 400 and sent to the digital television in step [SM4] includes a status display page instead of the update confirmation page. Because the sequence is otherwise identical to that shown in FIG. 9, it will not be further described here.

Figure 12A:
FIGS. 12A and 12B show the status display pages displayed on the browser of the digital television 110 during the sequence shown in FIG. 11.
Figure 12B:
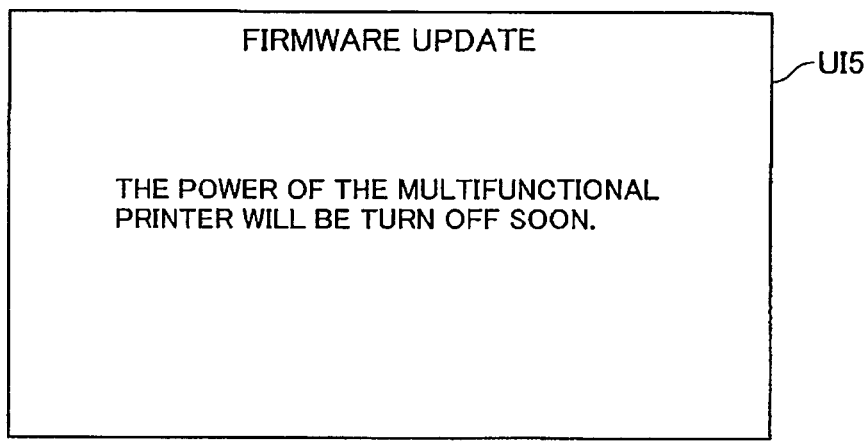

FIGS. 12A and 12B show the status display pages displayed on the browser of the digital television 110 during the sequence shown in FIG. 11. When the firmware update process is started, the user interface UI4 shown in FIG. 12A to notify the user that firmware update is in progress is displayed on the browser of the digital television 110. The situation where the user interface UI5 shown in FIG. 12B to notify the user that the power of the MFP 200 will be turned OFF is displayed on the browser of the digital television 110 will be described later.

Figure 13:
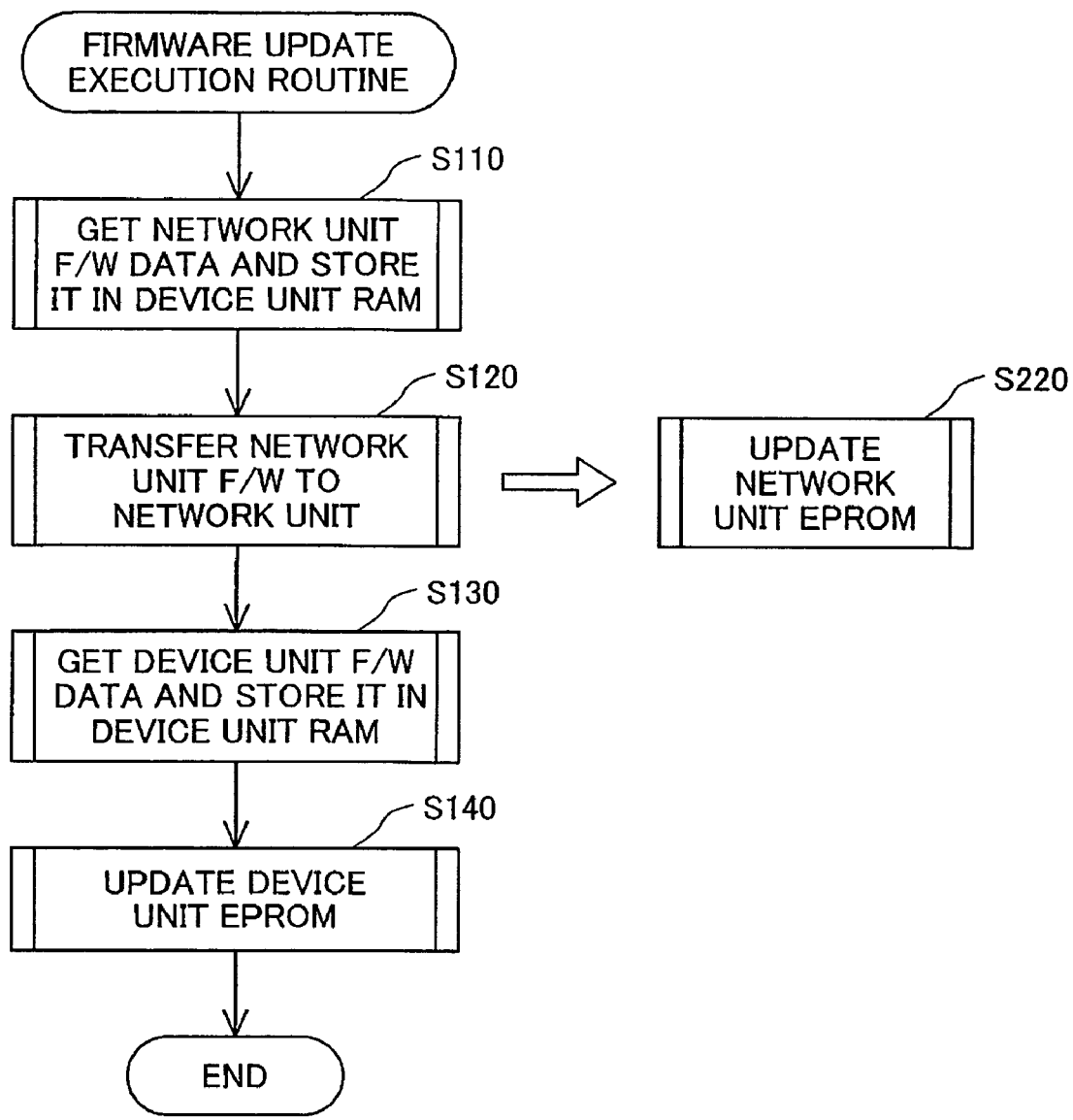
FIG. 13 is a flowchart showing the firmware update routine executed in order to update the firmware.

FIG. 13 is a flowchart showing the firmware update routine executed in order to update the firmware. The steps S110~S140 shown on the left side of the flowchart of FIG. 13 are steps executed by the device unit 400 to control the update process, while the step S220 shown on the right side is a step executed by the network unit 300 to control the update process.

In step S110, the device unit 400 gets the firmware data for the network unit 300 from the firmware storage server 130 (shown in FIG. 1) and stores it in the RAM 420 of the device unit 400 (shown in FIG. 2).

Figure 14:
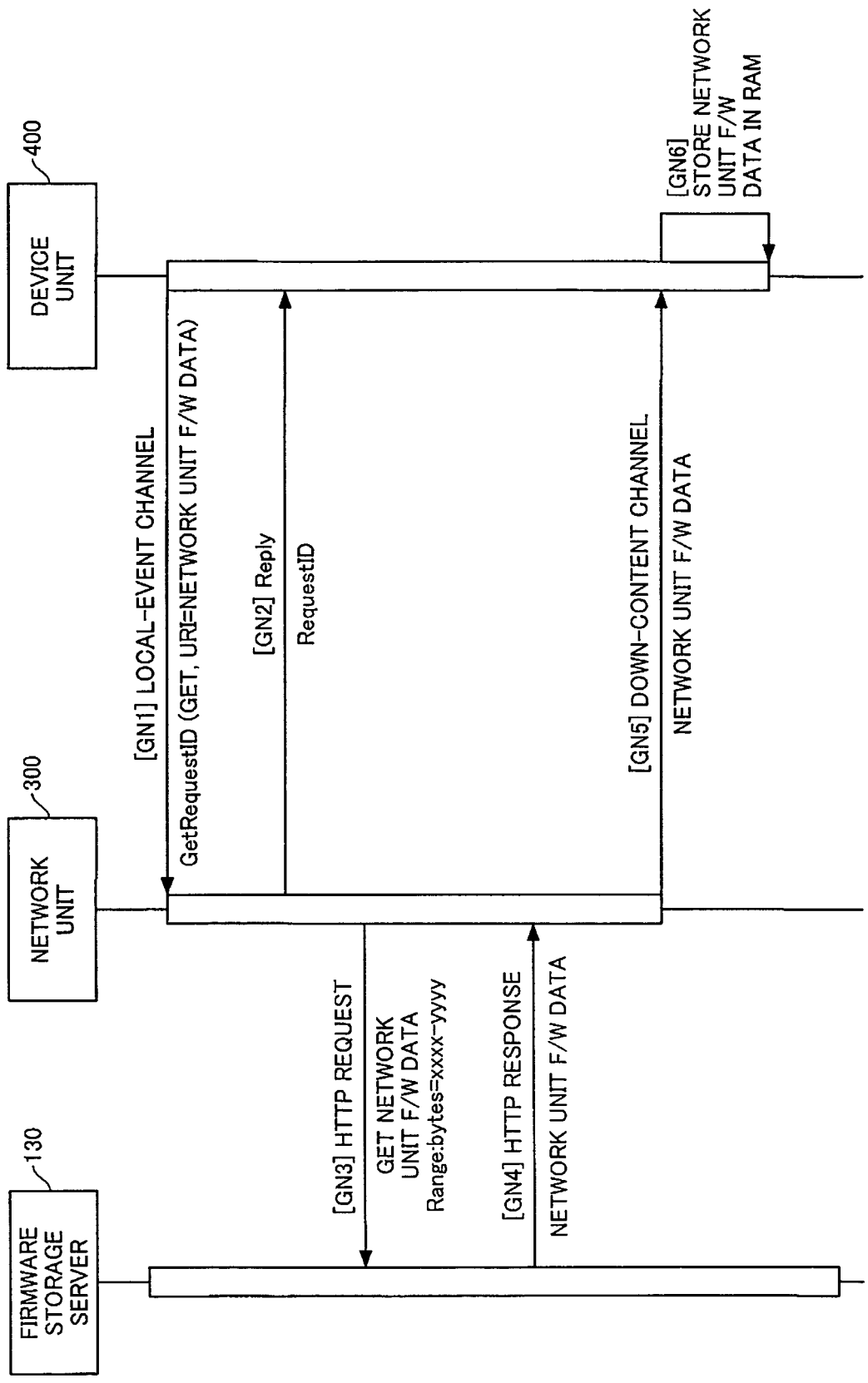
FIG. 14 is a sequence diagram of the situation in which the firmware data for the network unit 300 is obtained in step S110.

FIG. 14 is a sequence diagram of the situation in which the firmware data for the network unit 300 is obtained in step S110. As shown in FIG. 14, data is transferred among the firmware storage server 130, the network unit 300 and the device unit 400 in step S110.

In step [GN1], the device unit 400 sends a GetRequestID command to the network unit 300 via the LOCAL-EVENT channel. The URI indicating the location of the firmware data for the network unit 300 to be obtained and the request command (GET) used to obtain the firmware data for the network unit 300 are added to the GetRequestID command sent in step [GN1].

In step [GN2], the network unit 300 responds to the GetRequestID command received in step [GN1]. In step [GN3], a GET request that demands transmission of the firmware data for the network unit 300 is sent to the firmware storage server 130. In general, the free storage area in the RAM 320 (shown in FIG. 2) is smaller than the size of the firmware data for the network unit 300 when the network unit 300 is in operation. Consequently, in the GET request sent in step [GN3], a range of the firmware data to be transferred is specified by a range request header (Range: bytes =xxxx–yyyy), such that the size of the data to be transferred is thereby restricted. The firmware storage server 130 then sends the data in the range specified in the range request header from all data comprising the firmware data for the network unit 300. In the first embodiment, the firmware data range to be sent is specified by the network unit 300 adding the range request header to the GET request, but such range may be specified by the firmware storage server 130 instead.

In step [GN4], the firmware storage server 130 sends the firmware data for the network unit 300 to the network unit 300 as an HTTP response to the HTTP request received in step [GN3].

In step [GN5], the network unit 300 sends the firmware data for the network unit 300 received from the firmware storage server 130 in step [GN4] to the device unit 400 via the DOWN-CONTENT channel. The sent firmware data for network unit 300 is stored in the RAM 420 of the device unit 400 in step [GN6].

As described above, the range of the firmware data to be sent is specified by a range request header in the GET request sent to the firmware storage server 130 in step [GN3]. In order to send the entirety of firmware data sequentially, the network unit 300 changes the parameters of the range request as appropriate, and the steps [GN3] and [GN5] are executed repeatedly. Consequently, the entirety of firmware data is transferred sequentially to the device unit 400 in multiple separate installments. The device unit 400 sequentially stores the data transferred in step [GN5] in the RAM 420. As a result, all of the firmware data for the network unit 300 is stored in the RAM 420 of the device unit 400.

In step S120 of FIG. 13, the device unit 400 transfers the firmware data the network unit 300 stored in the RAM 420 to the network unit 300. In step S220, the network unit 300 updates the EPROM 330 (shown in FIG. 2) of the network unit 300 using the firmware data transferred in step S120. The two steps S120, S220 are executed in parallel by the device unit 400 and the network unit 300.

Figure 15:
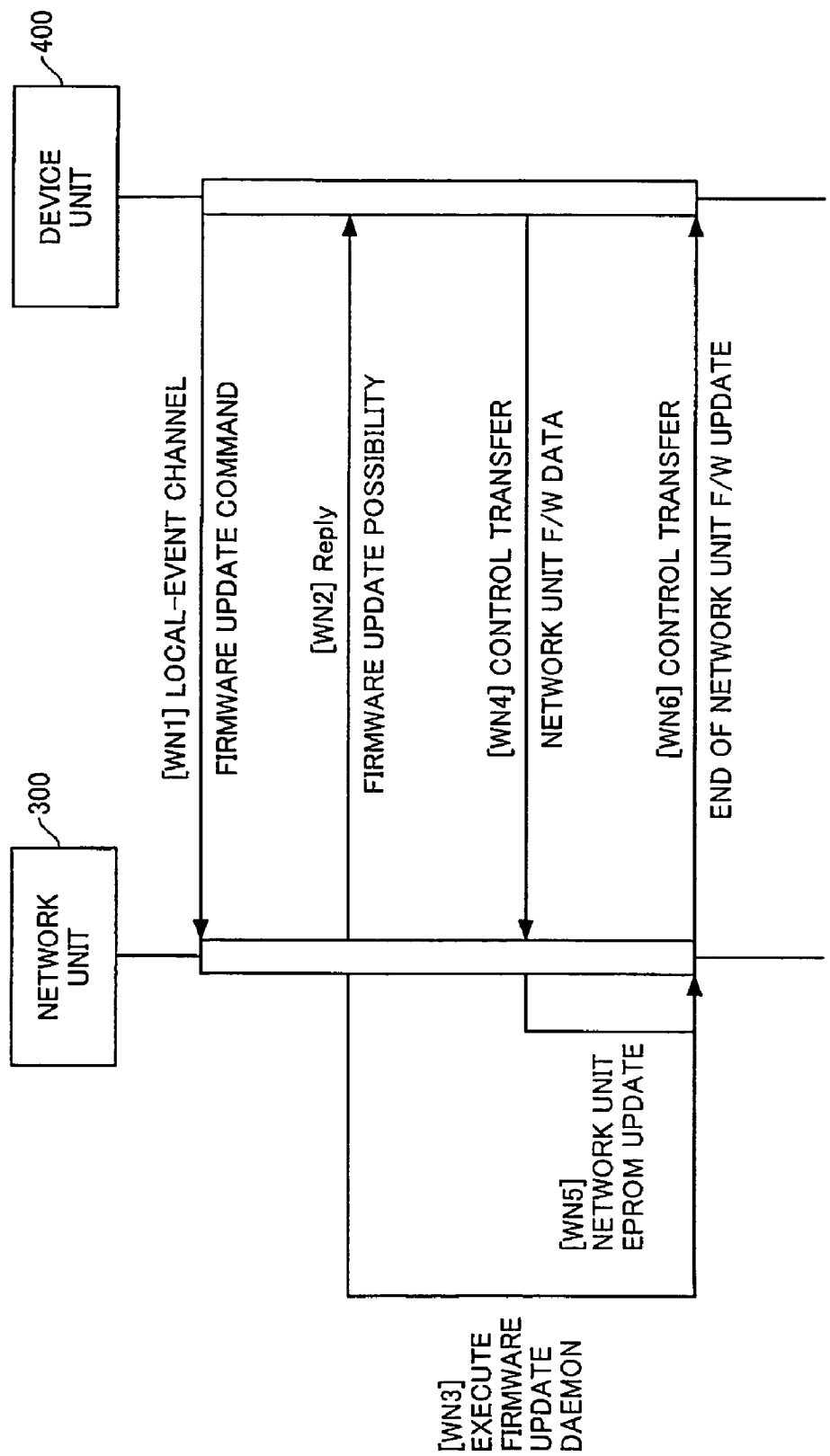
FIG. 15 is a sequence diagram of the transferring of the firmware data for the network unit 300 and the updating of the EPROM 330 in steps S120, S220.

FIG. 15 is a sequence diagram of the transferring of the firmware data for the network unit 300 and the updating of the EPROM 330 in steps S120, S220.

In step [WN1], the device unit 400 sends a command instructing to the network unit 300 to perform firmware update via the LOCAL-EVENT channel. In step [WN2], as a reply to the command received in step [WN1], the network unit 300 notifies the device unit 400 whether the firmware updating is available or not. Where it is determined from the reply received in step [WN2] that the updating of the firmware for the network unit 300 is not available, the firmware update process is terminated.

Where the firmware updating is available, the network unit 300 starts execution of the firmware update daemon in step [WN3]. The firmware update daemon is a computer program that exchanges data with the device unit 400 via the USB control IN/OUT pipe (shown in FIG. 3) and rewrites the EPROM 330 based on the transferred data. Data transfer performed via the control IN/OUT pipe is generally termed a "control transfer." A firmware transfer based on a control transfer uses a vendor request that is different from the default device request described above.

Where it is determined that updating of the firmware for the network unit 300 is available, the firmware data for the network unit 300 is sent to the network unit 300 with the control transfer in step [WN4]. In step [WN5], the network unit 300 sequentially updates the EPROM 330 of the network unit 300 to the firmware data transferred in step [WN4]. This updating of the EPROM 330 data is performed by deleting an area of the EPROM 330 to which data is to be written and then recording new data in the deleted area.

After the data updating in step [WN5] is completed, in step [WN6], the network unit 300 notifies the device unit 400 that updating of the firmware for the network unit 300 was completed with the control transfer.

In step S130 shown in FIG. 13, the device unit 400 obtains firmware data for the device unit 400 from the firmware storage server 130 (shown in FIG. 1) and stores the data in the RAM 420 of the device unit 400 (shown in FIG. 2). When step S130 of FIG. 13 is completed, the status display page generated in step [SM4] of FIG. 11 becomes HTML data notifying the user that power of the MFP 200 is to be turned OFF. Consequently, the user interface UI5 shown in FIG. 12B is displayed on the browser of the digital television 110 (shown in FIG. 1).

Figure 16:
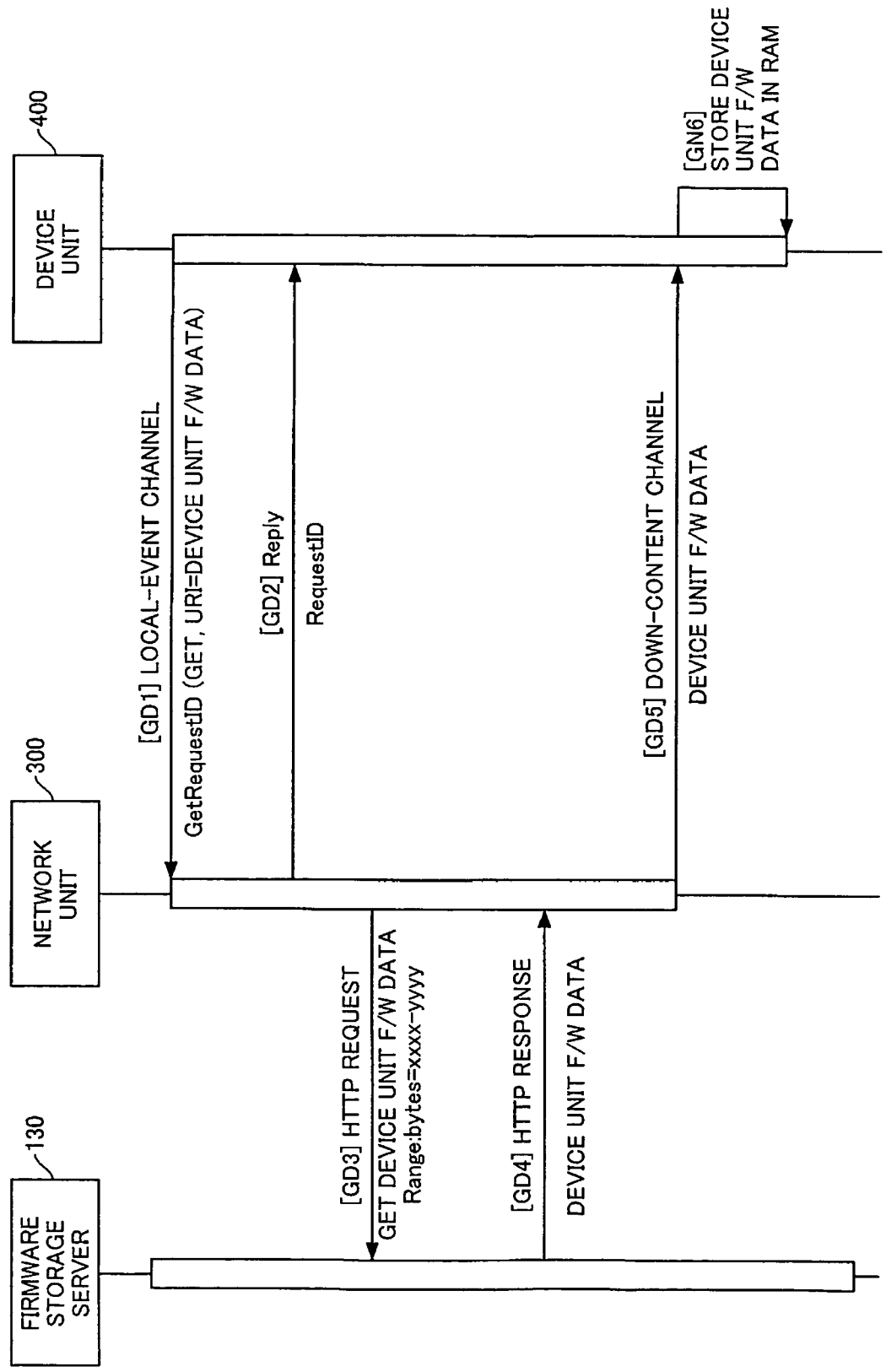
FIG. 16 is a sequence diagram of the situation in which the firmware data for the device unit 400 is obtained.

FIG. 16 is a sequence diagram of the situation in which the firmware data for the device unit 400 is obtained in step S130. The sequence shown in FIG. 16 differs from the sequence shown in FIG. 14 in that the firmware data to be obtained is the firmware data for the device unit 400 instead of the firmware data for the network unit 300. The sequence is in all other respects identical to the sequence for obtaining the firmware data for the network unit 300 shown in FIG. 14.

In step S140 of FIG. 13, the device unit 400 updates the EPROM 430 of the device unit 400 using the firmware data the device unit 400 stored in the RAM 420.

Figure 17:
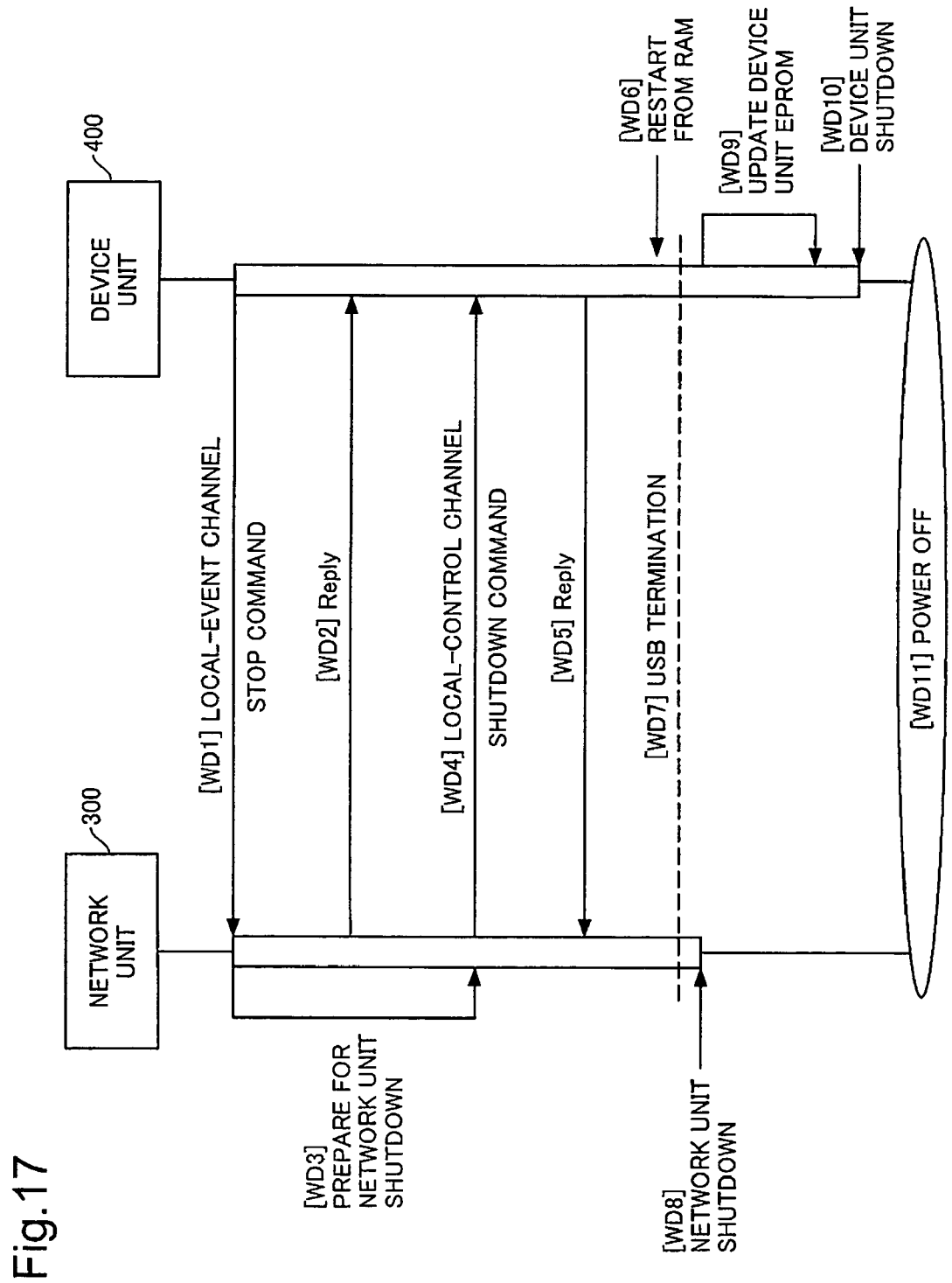
FIG. 17 is a sequence diagram of the updating of the EPROM 430 of the device unit 400 that takes place.

FIG. 17 is a sequence diagram of the updating of the EPROM 430 of the device unit 400 that takes place in step S140 of FIG. 13.

In step [WD1], the device unit 400 sends a stop command to the network unit 300 via the LOCAL-EVENT channel. The network unit 300 replies to the stop command received in step [WD1] in step [WD2].

In step [WD3], the network unit 300 prepares for shutdown of the network unit 300. Specifically, the processing functions of the various network protocols executed by the network unit 300 are stopped. When the network protocol functions are stopped and shutdown of the network unit 300 is enabled, the network unit 300 sends a shutdown command to the device unit 400 in step [WD4]. In step [WD5], the device unit 400 replies to the shutdown command received in step [WD4].

In step [WD6], the device unit 400 reboots from the RAM 420. Specifically, the control software executed by the device unit 400 is switched from the firmware recorded in the EPROM 430 to the firmware recorded in the RAM 420 in step [GD6] in FIG. 16.

As a result of the restart from the RAM 420, USB disconnection processing is executed in step [WD7]. When USB disconnection processing is performed in step [WD7], the network unit 300 shuts down in step [WD8] and its functions stop. At the same time, the device unit 400 updates the EPROM 430 in step [WD9].

When updating of the EPROM 430 in step [WD9] is completed, in step [WD10], the device unit 400 executes self-shutdown processing and outputs an instruction from the power supply controller 520 (shown in FIG. 2) to the power supply circuit 210 (shown in FIG. 2) to terminate the supply of power to the network unit 300 and the device unit 400. As a result of this power supply termination instruction, the power supply circuit 210 terminates the supply of power to the network unit 300 and the device unit 400 in step [WD11], whereupon the MFP 200 enters a power OFF state.

As described above, in the first embodiment, when the MFP 200 receives firmware data over the LAN, the network unit 300 gets part of the firmware data and sends it to the device unit 400. As a result, the need for an increase in the capacity of the RAM 320 of the network unit 300 to handle storage of the entirety of firmware data required for updating can be mitigated.

B. Second Embodiment

Figure 18:
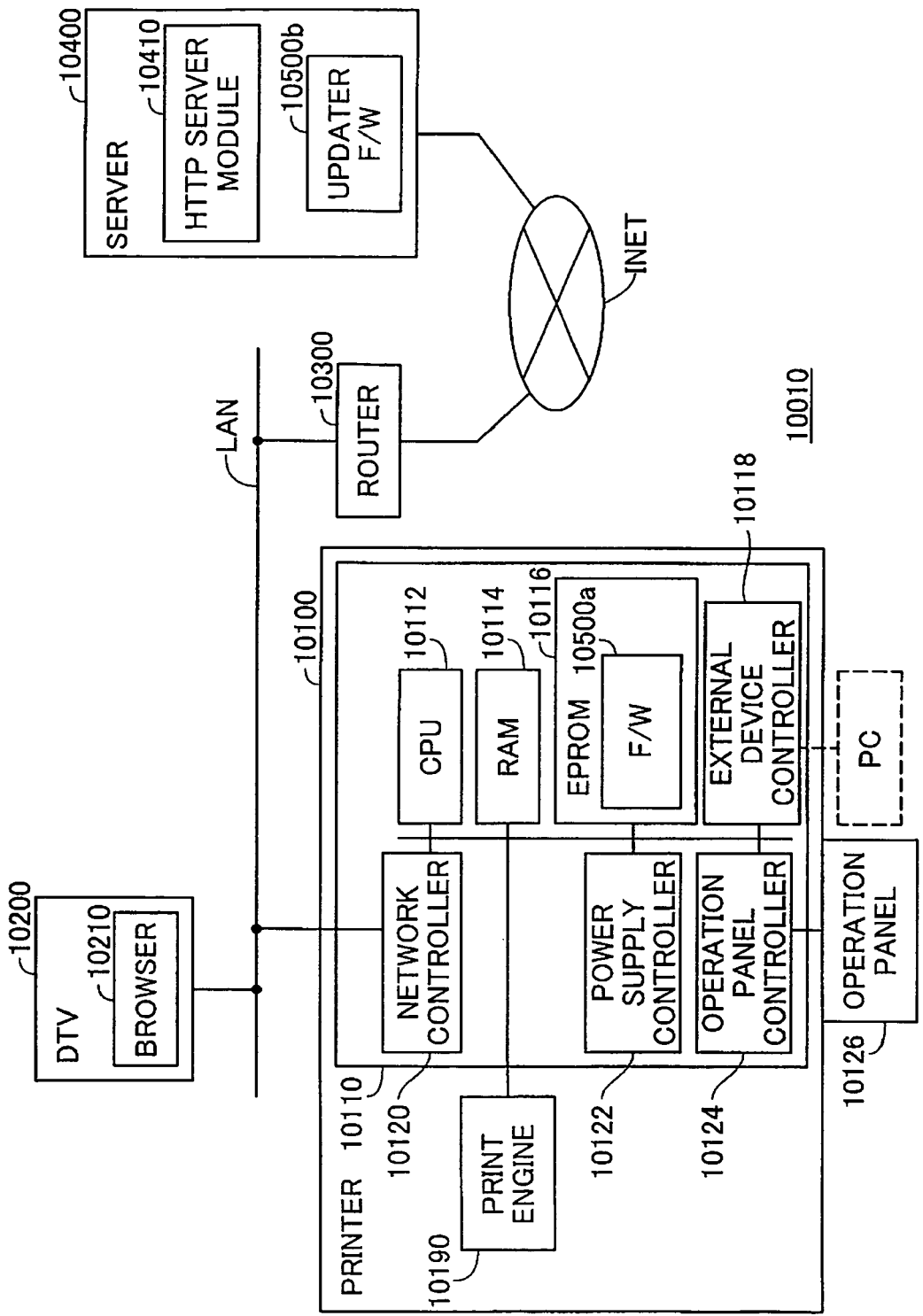
FIG. 18 is a schematic drawing showing the basic configuration of a network system as an embodiment of the present invention.

FIG. 18 is a schematic drawing showing the basic configuration of a network system as an embodiment of the present invention. In this network system 10010, a printer 10100 and a digital television 10200 are connected to each other over a LAN. The LAN may be a wired network based on the IEEE 802.3 standard or a wireless network based on the IEEE 802.11 b/g/a standard. In addition, a router 10300 is connected to the LAN. This router 10300 connects the LAN and the Internet INET. A server 10400 is connected to the Internet INET.

The digital television 10200 has functions to obtain HTML data described in HTML over the LAN and to display Web pages that are expressed via this HTML data using a browser 10210. The digital television 10200 also has a function to generate extensible HyperText Markup Language (XHTML) data for printing in XHTML using the browser 10210 and a function to transfer this XHTML data over the LAN to the printer 10210 for causing printing. The functions of the browser 10210 are realized with execution of a computer program by a computer (not shown). The printing based on this XHTML data is also termed "XHTML-print."

The printer 10100 has a controller 10110, a print engine 10190 and an operation panel 10126. The controller 10110 has a CPU 10112, a RAM 10114, an EPROM 10116, an external device controller 10118, a network controller 10120, a power supply controller 10122, and an operation panel controller 10124 that controls the operation panel 10126.

The operation panel 10126 that serves as input means is connected to the operation panel controller 10124 (shown in FIG. 18). The user can input various instructions using the operation panel 10126. The network controller 10120 functions as a network interface and is connected to the LAN. The power supply controller 10122 controls the overall ON/OFF state of the power supply for the printer 10100. The power supply controller 10122 may have various configurations. For example, a relay circuit or a transistor switch may be used for the power supply controller.

The external device controller 10118 functions as an interface to an external device. Various external devices such as a personal computer, a digital camera, or a memory may be connected to the external device controller 10118. A USB interface, for example, may be used as the interface.

The EPROM 10116 stores the firmware 10500a. The firmware 10500a includes computer programs to realize control functions with respect to the printer 10100. The CPU 10112 reads one of these computer programs from the EPROM 10116 and executes the read computer program. The EPROM 10116 is a non-volatile memory, and can retain stored information even if the power to the printer 10100 is switched OFF. Data can be deleted from or written to the EPROM 10116, enabling the firmware 10500a to be updated. Various non-volatile memory to or from which data can be written or deleted may be used as the EPROM 10116. For example, flash memory or an EEPROM may be used.

Figure 19:
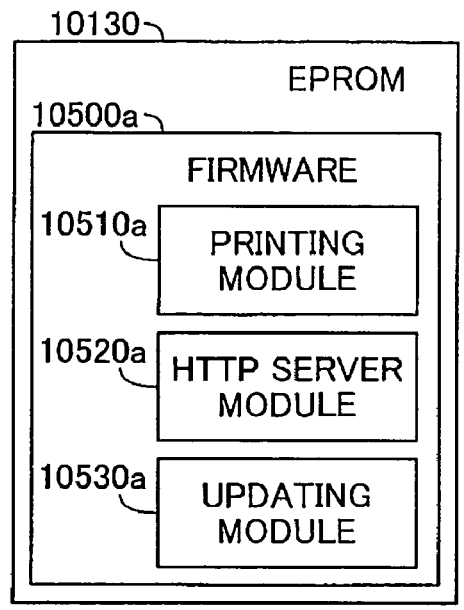
FIG. 19 shows the basic internal configuration of the firmware 10500a stored in the EPROM 10116.

FIG. 19 shows the basic internal configuration of the firmware 10500a stored in the EPROM 10116. In the second embodiment, the firmware 10500a includes a print module 10510a, an HTTP server module 10520a and an update module 10530a. The print module 10510a has a function to cause the print engine 10190 (shown in FIG. 18) to execute printing in response to a print request. The HTTP server module 10520a has a function to supply a Web page that displays the operation state of the printer 10100 (shown in FIG. 18) and allows user to input of instructions. The Web page is expressed as HTML data. The HTTP server module 10520a also performs data communication based on HTTP. The update module 10530a has a function to update the firmware stored in the EPROM 10116. The modules 10510a, 10520a, 10530a has computer programs executed by the CPU 10112. The functions of these modules will be described in more detail below.

The server 10400 (shown in FIG. 18) has a function to provide updater firmware 10500b over the Internet INET. The HTTP server module 10410 of the server 10400 transmits this firmware 10500b to the printer 10100 in response to a request therefrom. When this is done, the HTTP server module 10410 performs data communication based on HTTP. Note that data communication may be carried out using a different protocol such as FTP, for example. The functions of the HTTP server module 10410 are realized with the execution of a computer program on a computer (not shown). The configuration of the updater firmware 10500b supplied by the server 10400 is identical to that of the firmware 10500a shown in FIG. 19. In addition, the server 10400 can supply the firmware 10500b not only to the printer 10100 but also to other printers (not shown) with which the server 10400 can communicate over the Internet INET.

The print engine 10190 is a printing mechanism that executes printing in response to print data supplied by the controller 10110. In the second embodiment, the digital television 10200 transmits a print request to the printer 10100 based on an instruction from the user operating the browser 10210. This print request includes XHTML data used for printing. The print module 10510a (shown in FIG. 19) obtains the print request from the digital television 10200 over the LAN, interprets the XHTML data included in the obtained print request, performs color conversion and halftone processing to create print data, and supplies this print data to the print engine 10190. Note that a configuration may be adopted wherein the color conversion function and the halftone processing function are executed by the print engine 10190 rather than the print module 10510a (CPU 10112).

Various connections may be used for the connection between the controller 10110 and the print engine 10190. For example, they may be connected via a bus installed in the controller 10110 or via a USB interface. The controller 10110 and print engine 10190 may configured as separate devices also.

In addition to receiving print requests from the digital television 10200, the printer 10100 (print module 10510a) may also receive requests from another device connected over the LAN (such as a personal computer or digital camera not shown) parallelly. In other words, the printer 10100 (print module 10510a) can receive print requests from multiple devices that can communicate with the printer 10100 independently. The print module 10510a (shown in FIG. 19) stores each print request that it receives in the RAM 10114. The RAM 10114 can store multiple print requests. The print module 10510a selects a print request from among the received print requests as a processing target sequentially in the order in which they were received, and sequentially executes a series of processes to cause the print engine 10190 to perform printing based on the selected print request while switching among the processing target print requests. The print module 10510a deletes print requests for which printing has been completed from the RAM 10114. The series of printing-related processes executed in response to a print request are referred to collectively as a "print job" below.

The data used to express an image to be printed in a print request is not limited to XHTML data, and various other types of data may be used. For example, PDL data described in Page Description Language (PDL) may be used. In addition, JPEG or TIFF image data may be used.

Any of various formats may be used for the print request. For example, the printer 10100 and digital television 10200 may be configured as network apparatuses compatible with UPnP. In this case, the digital television 10200 can request that the printer 10100 perform printing with an exchange of messages between the digital television 10200 and printer 10100 based on the UPnP protocol. Alternatively, the digital television 10200 may transmit a print request to the printer 10100 using Line PRinter daemon protocol (LPR).

Incidentally, the sender of a print request is not limited to a device connected to the LAN, and other devices may send a print request. For example, the printer 10100 may receive a print request from an external device connected to the external device controller 10118 (such as a personal computer, a digital camera or a memory device). In this case, the print module 10510a receives the print request from the external device via the external device controller 10118, interprets the received print request, performs color conversion and halftone processing to create print data, and supplies this print data to the print engine 10190. In the second embodiment, the printer 10100 receives print requests from devices connected to the LAN as well as from external devices connected to the external device controller 10118. It is also acceptable that the printer 10100 receives print requests only from devices connected with one of these methods.

Figure 20:
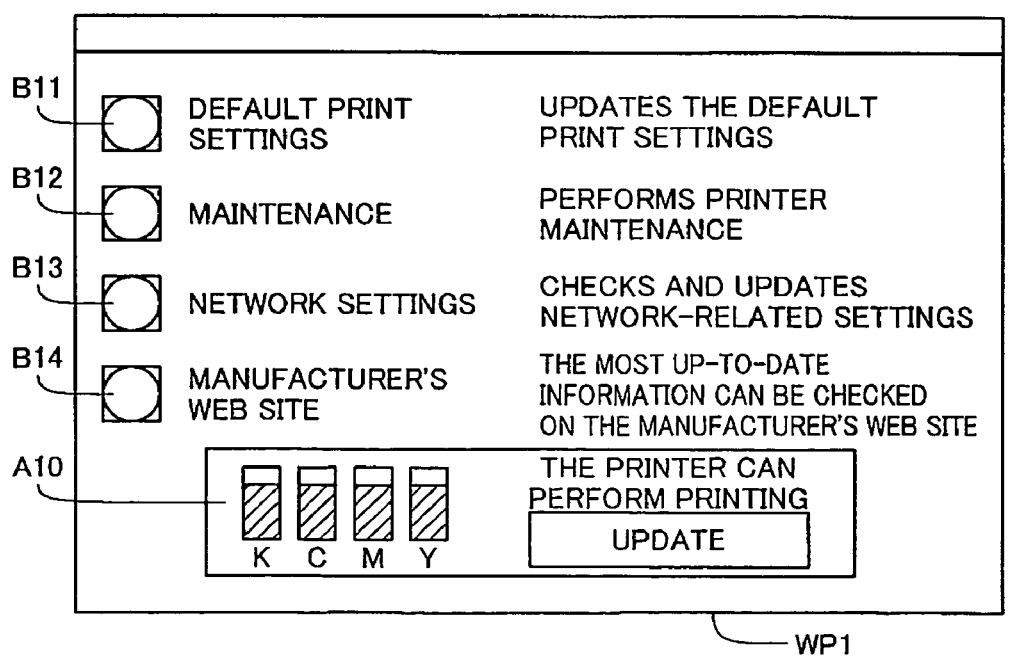

FIG. 20 is an explanatory drawing showing an example of a Web page provided by the HTTP server module 10520a (shown in FIG. 19). In the discussion below, it is assumed that the user accesses the Web page by operating the browser 10210 of the digital television 10200 (shown in FIG. 18). The HTTP server module 10520a can provide the Web page at any stage of the printing process. Furthermore, the controller 10110 can receive user instructions with the Web page at any stage of the printing process.

This Web page WP1 has four buttons B11~B14 and a status display area A10. The first button B11 is a button used to display a Web page by which to change the default print settings (not shown). The second button B12 is a button used to display a printer maintenance Web page (described below). The third button B13 is a button used to display a network configuration Web page (not shown). The fourth button B14 is a button used to display the manufacturer's Web page (not shown). The remaining ink amount and the status of the printer 10100 are displayed in the status display area A10.

Figure 21:
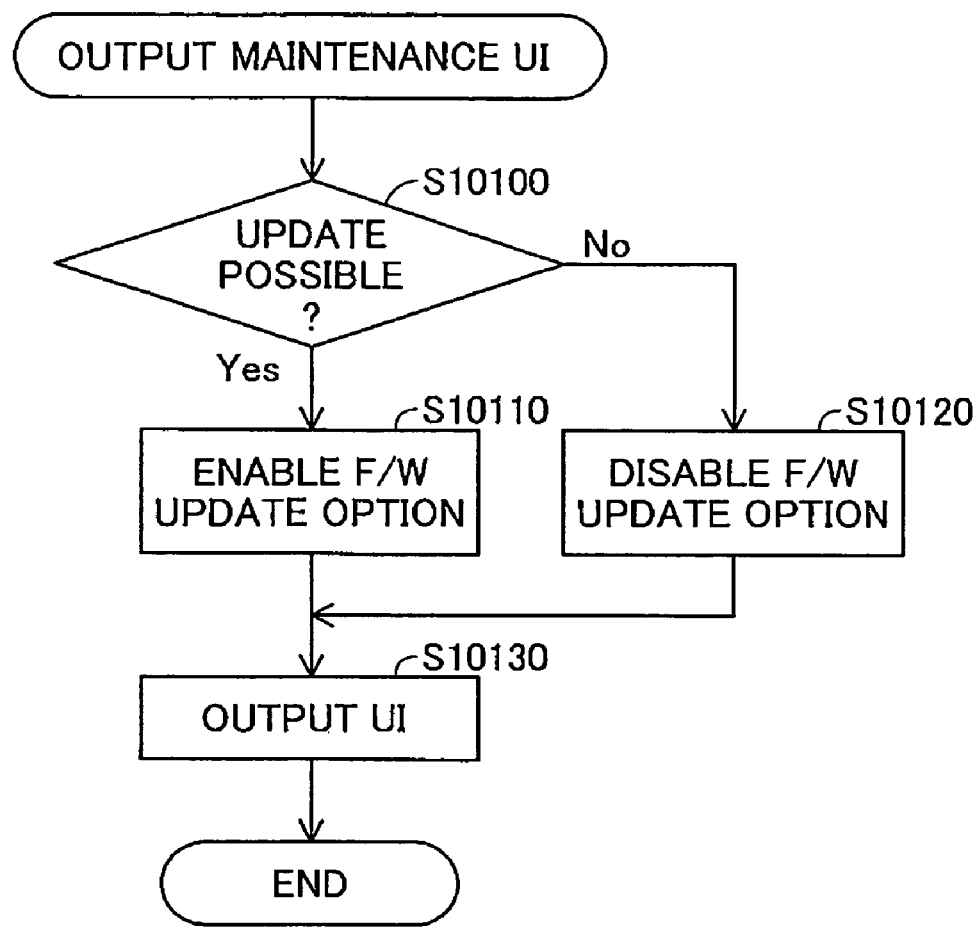
FIG. 21 is a flowchart showing the sequence of operations of the maintenance Web page output process.
Figure 22:
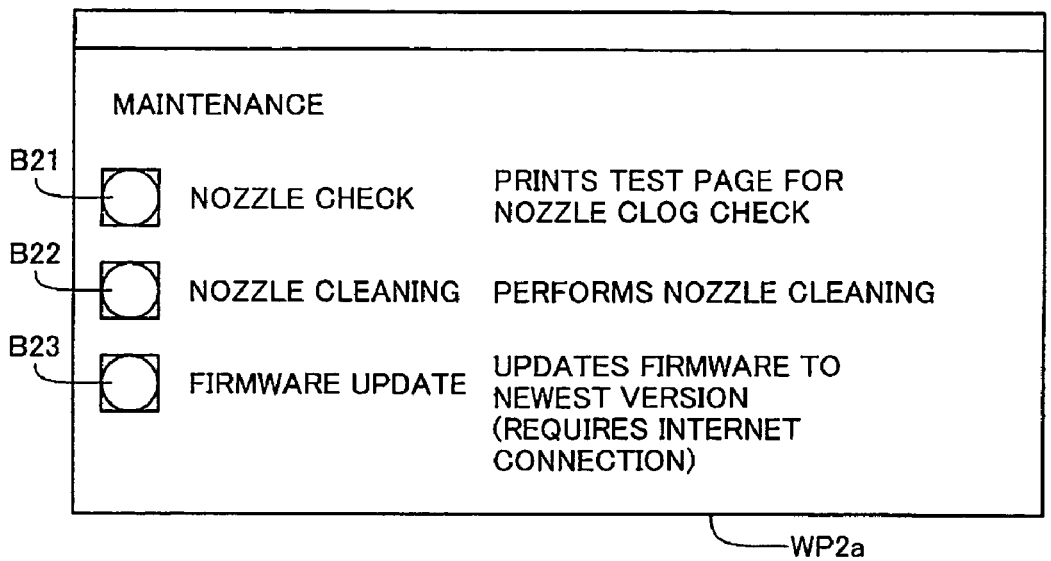
FIG. 22 is an explanatory drawing showing an example of the maintenance Web page in which the firmware update option is enabled.

When the user operates the second button B12, the HTTP server module 10520a outputs the maintenance Web page. FIG. 21 is a flowchart showing the sequence of operations of the maintenance Web page output process. In the first step S10100, the HTTP server module 10520a determines whether or not a connection can be made to the server 10400 that supplies the firmware. The HTTP server module 10520a attempts to communicate with the server 10400, and if communication is successful, it determines that communication is possible, while if communication is unsuccessful, it determines that communication is not possible. The HTTP server module 10520a uses a prescribed value (such as an IP address) as an identifier to specify the server 10400 on the Internet INET.

Where it is determined that communication is possible, the HTTP server module 10520a enables the firmware update option on the maintenance Web page (step S10110) and outputs the update-enabled maintenance Web page (step S10130). FIG. 22 is an explanatory drawing showing an example of the maintenance Web page in which the firmware update option is enabled. This Web page WP2a has three buttons B21-B23. The first button B21 is used to cause the printer 10100 to perform a nozzle check. The second button B22 is used to cause the printer 10100 to perform nozzle cleaning. The third button B23 is used to cause the printer 10100 to update the firmware.

Figure 23:
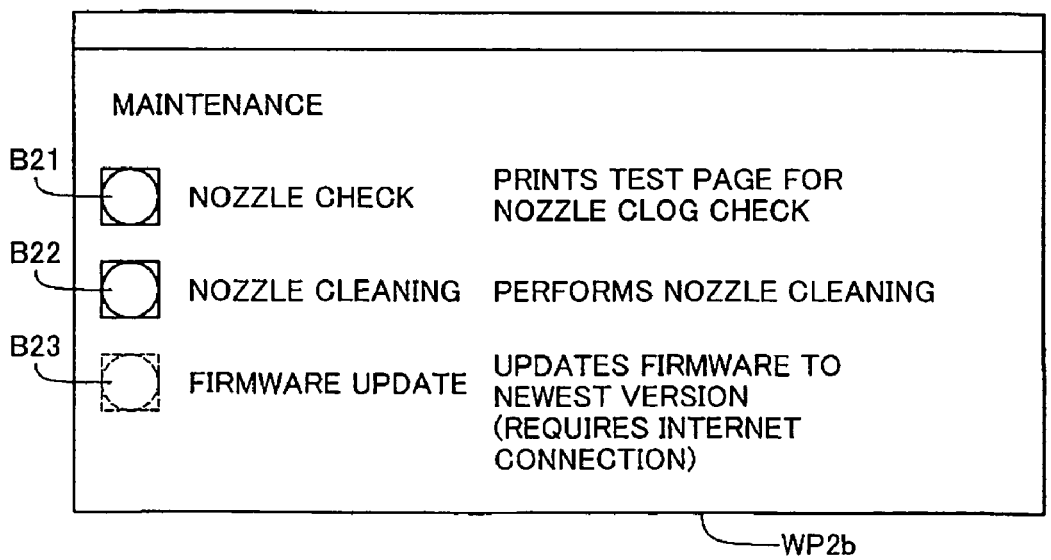
FIG. 23 is an explanatory drawing showing an example of the maintenance Web page whose firmware update option has been disabled.

If it is determined that communication is not possible, however, the HTTP server module 10520a disables the firmware update option in the maintenance Web page in step S10120 and outputs the update-disabled maintenance Web page (user interface) in step S10130. FIG. 23 is an explanatory drawing showing an example of the maintenance Web page whose firmware update option has been disabled. In this Web page WP2b, the third button B23 is disabled, unlike in the Web page WP2a shown in FIG. 22. In other words, the user cannot operate this third button B23. Any of various methods may be used to indicate that this button is disabled. For example, a method may be used in which enabled buttons are displayed in a chromatic color, while disabled buttons are displayed in an achromatic color. Alternatively, a method may be used in which disabled buttons are displayed in a weaker color than enabled buttons, or in which disabled buttons mare removed from the Web page entirely.

It is acceptable if in step S10100, the HTTP server module 10520a not only checks regarding whether a connection to the server 10400 may be made, but also checks with the server 10400 regarding whether newer firmware exists. If the server 10400 does not contain newer firmware, i.e., if the current firmware 10500a is the newest version available, the HTTP server module 10520a may advance to step S10120. If more recent firmware does exist, however, the HTTP server module 10520a may progress to step S10110. Any of various methods for determining whether newer firmware exists may be used. In one such method, for example, first the HTTP server module 10520a sends the printer 10100 model information and version information regarding the current firmware 10500a to the server 10400. Next, the server 10400 replies to the server 10400 regarding the result of its check into whether firmware that is newer than the current version and compatible with that model of the printer 10100. The server 10400 response function described here may be realized by the HTTP server module 10410, for example. In addition, the information used to specify the updater firmware is not limited to a combination of model information and version information, and various other types of information may be used. For example, information pertaining to the destination of the printer 10100 may be used.

Figure 24:
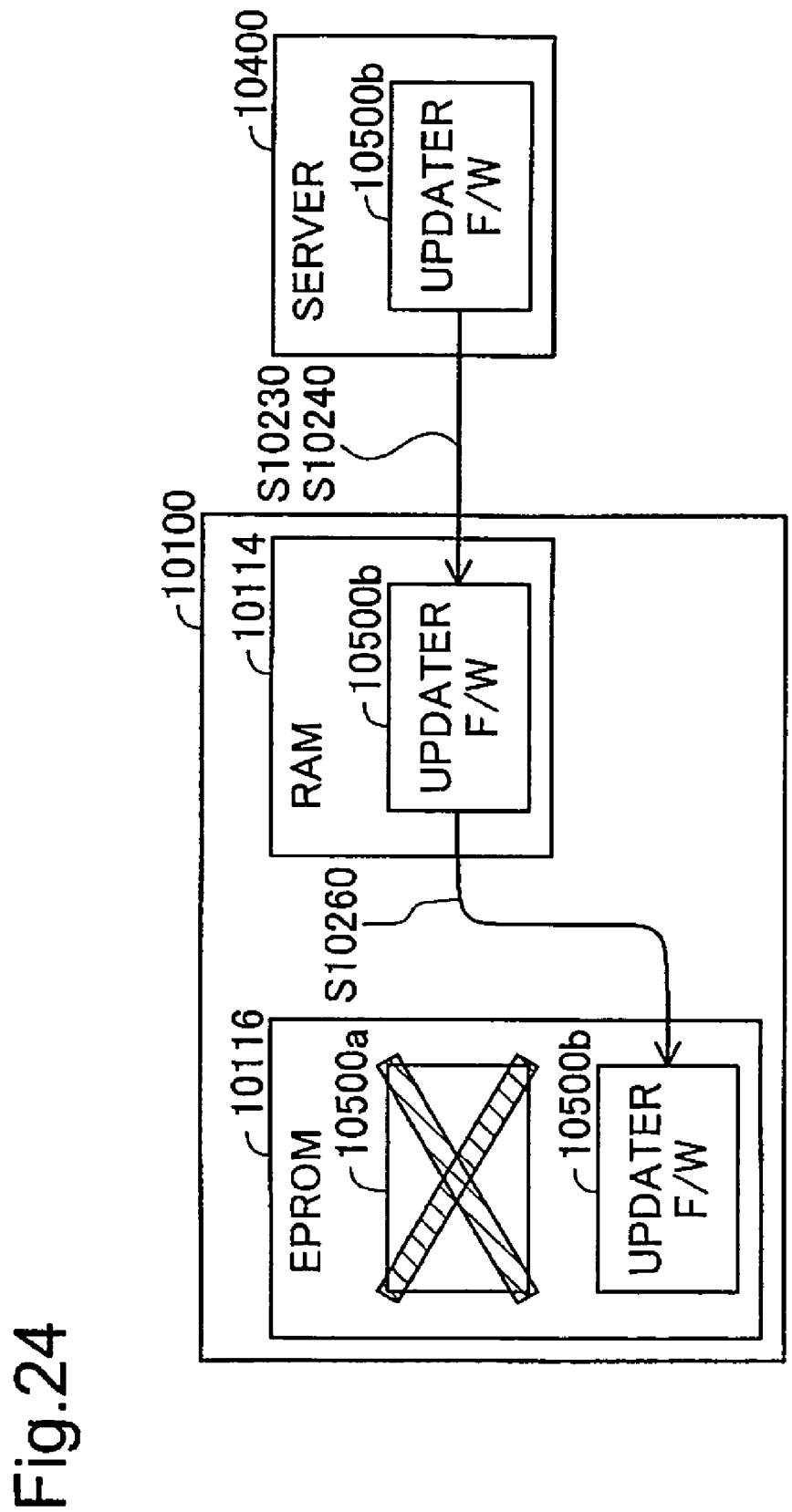
FIG. 24 is an explanatory drawing showing the firmware update process in summary.

If the user operates the third button B23 used for firmware update (shown in FIG. 22), the printer 10100 executes the firmware update process. FIG. 24 is an explanatory drawing showing the firmware update process in summary. When the printer 10100 obtains the updater firmware 10500b from the server 10400, it stores the obtained updater firmware 10500b in the RAM 10114. Next, the printer 10100 deletes the old firmware 10500a stored in the EPROM 10116 and writes the new firmware 10500b to the EPROM 10116.

Figure 25:
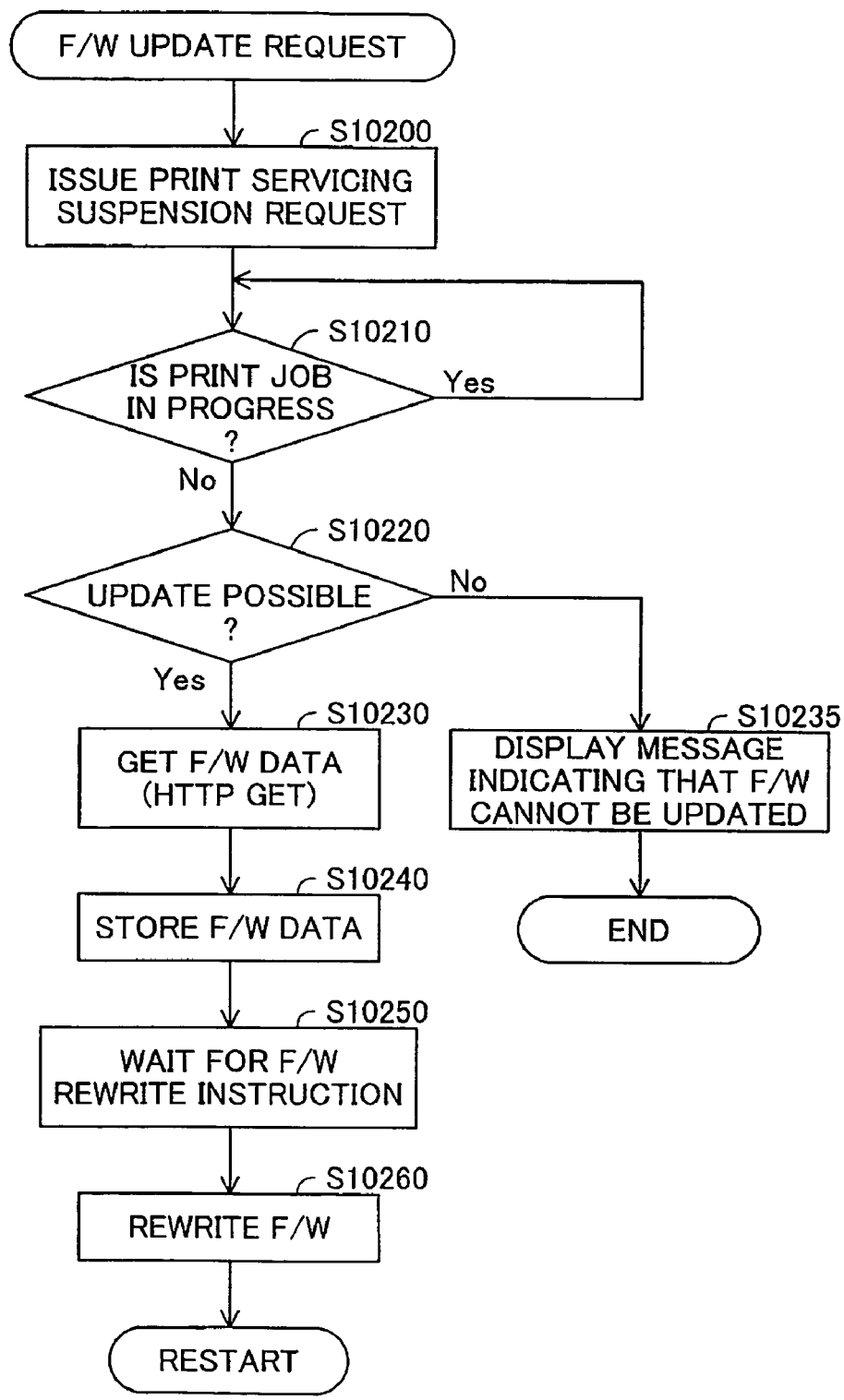
FIG. 25 is a flowchart showing the sequence of operations of the firmware update process.

FIG. 25 is a flowchart showing the sequence of operations of the firmware update process. The update module 10530a begins the update process of FIG. 25 in response to user operation of the third button B23 (shown in FIG. 22) used for firmware updating. The sequence of operations for update processing according to the flowchart of FIG. 25 corresponds to the sequence of operations for such processing in the "standby update mode" of the present invention.

In step S10200, the update module 10530a (shown in FIG. 19) issues a print servicing suspension request. This is a process to suspend the receipt of new print requests. For example, the update module 10530a may cause the operation panel controller 10124 (shown in FIG. 18) to lock the operation panel 10126. In this way, the receipt of new print requests via user instruction input to the operation panel 10126 can be stopped. Furthermore, the external device controller 10118 may be caused to sever the connection to external devices. In this way, the receipt of new print requests from external devices can be stopped. Where the printer 10100 has a UPnP-compatible network apparatus, the update module 10530a may cause the network controller 10120 to advertise to other devices connected to the LAN (such as the digital television 10200, for example) the fact that the printer 10100 is disconnecting from the LAN. In this way, the receipt of new print requests from the LAN can be stopped. In the second embodiment, the update module 10530a can execute all of the processes described above.

In the next step S10202, the update module 10530a determines whether or not a print job is executed. In this embodiment, the controller 10110 can receive print requests and firmware update requests (by the operation of the third button B23 shown in FIG. 22) independently from each other. In other words, the controller 10110 (update module 10530a) can receive a firmware update request while a print job is in progress. Accordingly, where a print job is in progress, i.e., where print processing is executed by the print module 10510a and the print engine 10190, the update module 10530a suspends firmware updating until the completion of print processing. Here, the update module 10530a waits for the completion of all print jobs for which a print request has already been received.

If no print job is in progress, i.e., if all received print requests have been completely executed, in the next step S10220, the update module 10530a checks with the server 10400 regarding whether newer firmware resides on the server 10400 (shown in FIG. 18). Specifically, the update module 10530a first determines whether or not a connection can be made to the server 10400. If a connection can be made, the update module 10530a checks with the server 10400 regarding whether more recent firmware exists. The operation of this step S10220 is performed in the same manner as for the step S10100 in FIG. 21.

Figure 26:
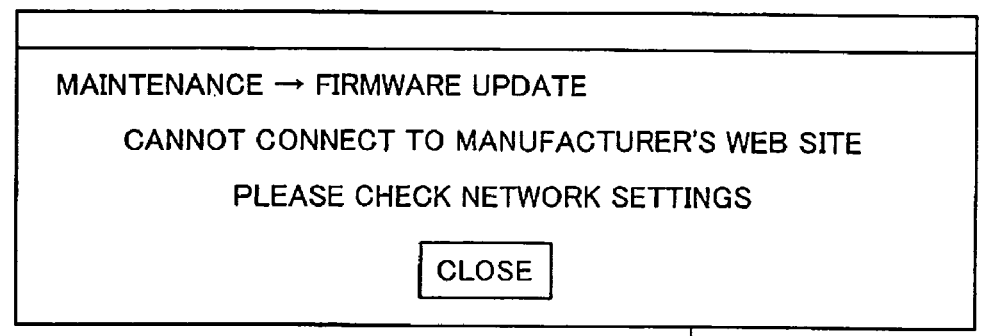
FIG. 26 is an explanatory drawing showing an example of the Web page output in step S10235.

If it is determined that a connection to the server 400 cannot be made, in step S10235, the update module 10530a causes the HTTP server module 10520a to output a Web page displaying a message indicating that the firmware cannot be updated and thereupon ends the update process. FIG. 26 is an explanatory drawing showing an example of the Web page output in step S10235. Where this Web page WP3 is displayed on the digital television 10200 (shown FIG. 18), the user can execute firmware update processing on the printer 10100 by accessing the Web page WP1 shown in FIG. 20 once more after checking the network configuration.

If newer firmware does not exist on the server 10400 (shown in FIG. 18), the update module 10530a advances to step S10235. In this case, the update module 10530a causes the HTTP server module 10520a to output a Web page displaying a message that the firmware need not be updated (not shown), and terminates the update processing.

If more recent firmware (the updater firmware 10500b shown in FIG. 24) does reside on the server 10400 (shown in FIG. 18), the update module 10530a obtains the updater firmware 10500b from the server 10400 in the next step S10230. In this embodiment, the update module 10530a transmits an HTTP "GET request" to the HTTP server module 10410. In this case a predetermined URL that specifies the location of the firmware 10500b is specified by the GET request. Alternatively, the update module 10530a may obtain from the server 10400 the URL that corresponds to the model type and the version number. Various different methods may be used as the method for obtaining this URL. For example, a method may be adopted in which the HTTP server module 10410 notifies the update module 10530a of the URL when it checks whether or not newer firmware exists (step S10220). Here, the URL may indicate a resource comprising a server different from the server 10400 (not shown). A URL is an identifier indicating the position of a resource (information resource).

Figure 27:
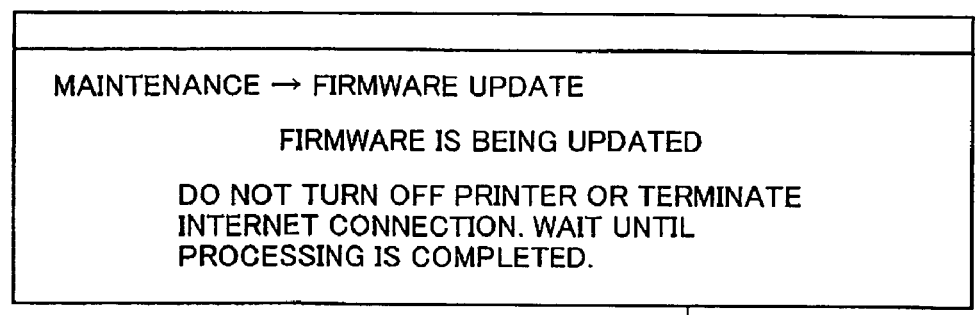
FIG. 27 is an explanatory drawing showing an example of the Web page output in step S10230.

The HTTP server module 10410 transmits to the printer 10100 the firmware 10500b specified in the URL in response to the GET request. In response to the receipt of the firmware 10500b, the update module 10530a causes the HTTP server module 10520a to output a Web page displaying a message indicating that update processing is in progress. FIG. 27 is an explanatory drawing showing an example of the Web page output in step S10230. The user can learn that update processing is in progress by accessing this Web page WP4 displayed on the digital television 10200.

In the next step S10240, the update module 10530a stores the received firmware 10500b in the RAM 10114.

Figure 28:
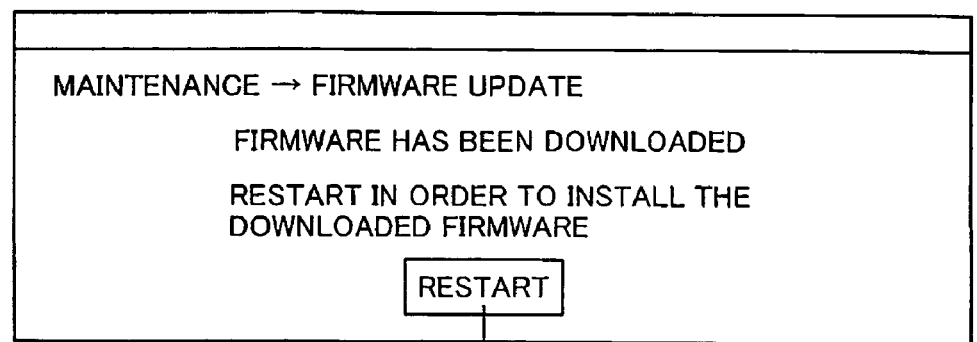
FIG. 28 is an explanatory drawing showing an example of the Web page output in step S10250.

In the next step S10250, in response to the storage of the complete firmware 10500b in the RAM 10114, the update module 10530a causes the HTTP server module 10520a to output a Web page by which to obtain an instruction to enable the new firmware. FIG. 28 is an explanatory drawing showing an example of the Web page output in step S10250. This Web page WP5 has a restart button B50.

When the user operates the restart button B50 (shown in FIG. 28), the routine advances to the next step S10260. In response to the operation of the restart button B50, the update module 10530a switches the computer program to be executed by the CPU 10112 from the firmware 10500a stored in the EPROM 10116 to the firmware 10500b stored in the RAM 10114. Specifically, the CPU 10112 ends control based on the firmware 10500a and begins control based on the updater firmware 10500b. This updater firmware 10500b includes an update module (not shown) identical to the update module 10530a. According to this update module, the CPU 10112 deletes the firmware 10500a from the EPEOM 10116 and then writes the firmware 10500b in the RAM 10114 to the EPROM 10116. Because the CPU 10112 already is operating based on the firmware 10500b residing in the RAM 10114, there is no problem with the operation of the CPU 10112 even if the firmware 10500a in the EPROM 10116 is deleted. The CPU 10112 then ends control based on the firmware 10500b stored in the RAM 10114 and begins control based on the firmware 10500b stored in the EPROM 10116. This switching of control is also carried out based on the update module of the firmware 10500b stored in the RAM 10114.

As described above, in the step S10260, the computer program executed by the CPU is switched from firmware 10500a stored in the EPROM 10116 to the firmware 10500b stored in the RAM 10114. Therefore, the update processing of the second embodiment according to the flowchart of FIG. 25 may also be termed a "standby switching mode."

In response to the updating of the firmware in the EPROM 10116, the CPU reinstates print servicing (receipt of print requests) based on the firmware in the EPROM 10116.

While the update process is transitioning from step S10230 to step S10250, the browser 10210 (shown in FIG. 18) automatically and repeatedly executes operations to obtain a Web page from the HTTP server module 10520a of the printer 10100. Various methods may be used to cause the browser 10210 to automatically obtain the Web page in this manner. For example, a method of describing "Meta Refresh Tag" of HTML on Web page WP4 (shown in FIG. 27) may be used. Here, the HTTP server module 10520a may switch the Web page transmitted to the digital television 10200 in step S10250 from the Web page WP4 to the Web page WP5. Note that, the repeated obtaining of the Web page (updating) may be omitted.

In the second embodiment, as described above, the update module 10530a obtains the updater firmware 10500b directly from the server 10400 via a network (a LAN or the Internet). Therefore, updating of the firmware for the printer 10100 can be executed based on the updater firmware directly obtained from the server 10400 without using another device (such as a personal computer) having a function to transmit the obtained updater firmware to the printer 10100.

In the second embodiment, the update module 10530a stops the receipt of new print requests in response to a firmware update request (issued by the operation of the third button B23 shown in FIG. 22) and allows update processing to proceed following the completion of print processing of all pending print requests (steps S10200, S10210 of FIG. 25). In other words, firmware updating is carried out while no print job is executed. Therefore, the problems such as the premature termination of a print job occurring as a result of firmware update processing can be mitigated. In particular, when plural users independently use the same printer 10100, the user who directs the update of the firmware doesn't occasionally know other users' print situations. Even in this situation, the occurrence of printing problems can be prevented.

Furthermore, because the update module 10530a issues a print servicing suspension request in response to the receipt of a firmware update request (S10200 in FIG. 25), the update module can execute firmware updating immediately while no print jobs are printed.

In the "standby update mode" shown in FIG. 25, the firmware is rewritten regardless of whether a power supply ON/OFF state switch request is present, unlike in the "power-synchronous update mode" described later. In other words, in the first embodiment, firmware update processing is executed independently of the operation of the power supply controller 10122. Therefore, in the second embodiment, the power supply controller 10122 may be omitted from the controller 10110.

C. Third Embodiment

Figure 29:
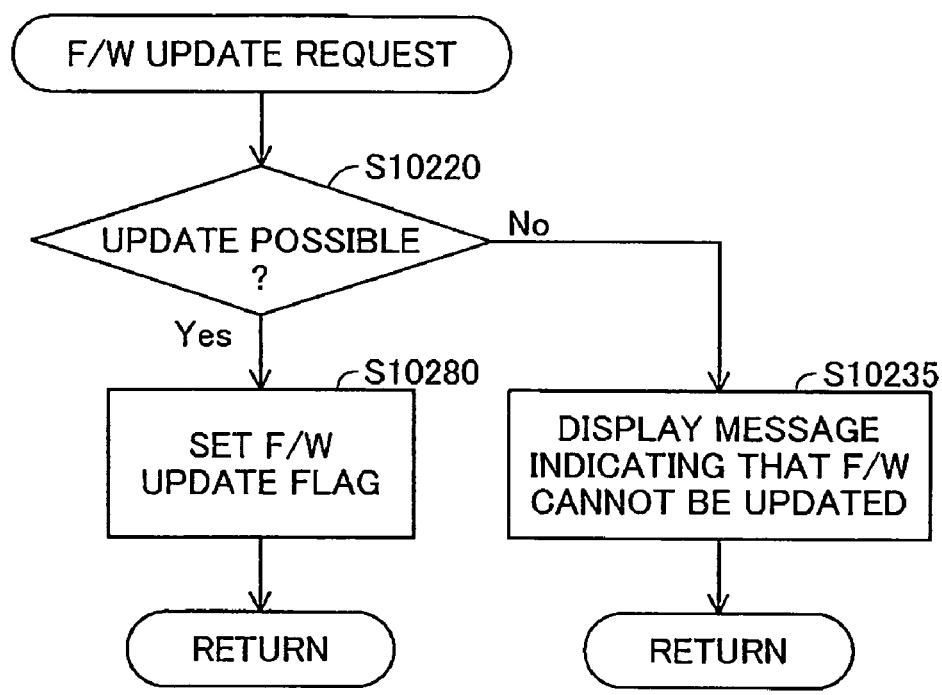
FIGS. 29 and 30 are flowcharts showing the sequence of operations of the firmware update process.
Figure 30:
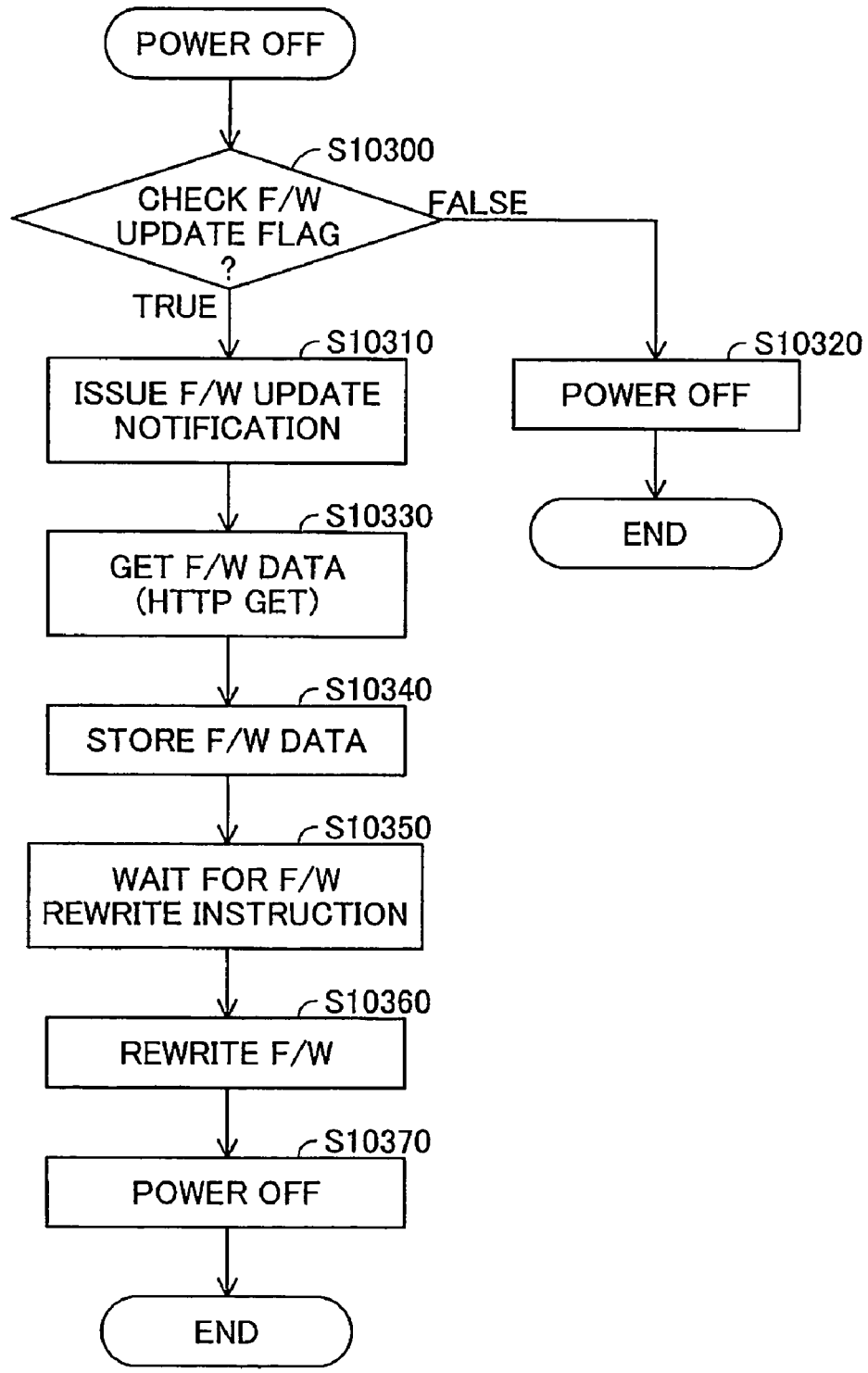

FIGS. 29 and 30 are flowcharts showing the sequence of operations of the firmware update process executed in the third embodiment. The sequence of operations according to the flowcharts of FIGS. 29 and 30 corresponds to the sequence of operations in the "power-synchronous update mode" of the present invention. The power-synchronous update mode differs from standby update mode shown in FIG. 25 in that the firmware is rewritten when the power to the printer 10100 is turned OFF. The network system configuration is identical to that of the network system 10010 of the second embodiment shown in FIG. 18. The firmware configuration is also identical to that of the firmware 10500a of the second embodiment shown in FIG. 18.

The process shown in FIG. 29 is started by the update module 10530a in response to the user's operation of the third button B23 (shown in FIG. 22) used for firmware updating. In addition, the operations of steps S10220, S10235 are identical to the operations of the corresponding steps shown in FIG. 25.

Where it is determined in step S10220 that more recent firmware resides on the server 10400, the update module 10530*a* sets the firmware update flag to "TRUE" in the next step S10280. This update flag is data stored in the RAM 10114, and is normally set to "FALSE". It is used when the power is turned OFF as described below. The update module 10530*a* terminates the process after the update flag is set to "TRUE".

FIG. 30 is a flowchart showing the sequence of operations executed when the power to the printer 10100 is turned OFF. First, the update module 10530*a* (shown in FIG. 19) starts the update processing of FIG. 30 in response to the pressing of the power button (not shown) on the operation panel 10126 (shown in FIG. 18). When a power-OFF instruction is received, (i.e., when the power button not shown is pressed), the update module 10530*a* starts the processing shown in FIG. 30 after the completion of print processing for all pending print requests. For example, the update module 10530*a* starts the processing of FIG. 30 after the operations of steps S10200, S10210 of FIG. 25 are completed.

Various types of instructions may be used for the instruction to alternate the ON/OFF state of the power supply, and such instruction is not limited to an instruction input with the operation panel 10126. For example, an instruction issued from an external device connected to the external device controller 10118 or an instruction issued from another network apparatus connected to the LAN may be used. This is similar in other embodiments described later.

In the first step S10300, the update module 10530*a* (shown in FIG. 19) determines whether or not the update flag is "TRUE". If the update flag is "FALSE", the update module 10530*a* advances to step S10320 and causes the power supply controller 10122 to sever power to the printer 100, whereupon it ends processing.

If the update flag is "TRUE", the update module 10530*a* advances to step S10310 and issues a firmware update notification. The update module 10530*a* issues this notification by causing the HTTP server module 10520*a* to output a notification Web page, for example. A Web page identical to the Web page WP4 shown in FIG. 26 may be used, for example, as this notification Web page. The update module 10530*a* may alternatively cause the fact that the firmware is to be updated to be displayed on the display screen (not shown) of the operation panel 10126 by controlling the operation panel controller 10124.

The CPU 10112 (shown in FIG. 18) executes the operations of steps S10330~S10360. The operations of these steps S10330~S10360 are identical to the operations of steps S10230~S10260 shown in FIG. 25. Once the writing of the updater firmware is completed, the CPU 10112 causes the power supply controller 10122 to turn OFF power (step S10370) and terminates processing. During step S10370, the CPU 10112 is operating based on the new firmware stored in the RAM 10114. The operation to cut off power is executed based on the update module of the new firmware (not shown).

In the step S10360, the computer program executed by the CPU 10112 is switched from the firmware 10500*a* stored in the EPROM10116 to the firmware 10500*b* stored in the RAM10114 as well as the step S10260 (shown in FIG. 25). Therefore, the update processing of the third embodiment according to the flowchart of FIG. 30 may also be termed a "power-synchronous switching mode."

When power is subsequently turned ON, the CPU 10112 begins print servicing (i.e., begins accepting print requests) based on the new firmware stored in the EPROM 10116.

In the third embodiment, as described above, where the update module 10530*a* receives a firmware update request (with operation of the third button B23 shown in FIG. 22), it begins firmware update processing in response to the receipt of a power OFF request (as shown in FIG. 30). Because the firmware is updated when the power to the printer 10100 is turned OFF, the problem that printing cannot be performed due to the suspension of print servicing implemented in order to update the firmware can be prevented.

D. Fourth Embodiment

Figure 31:
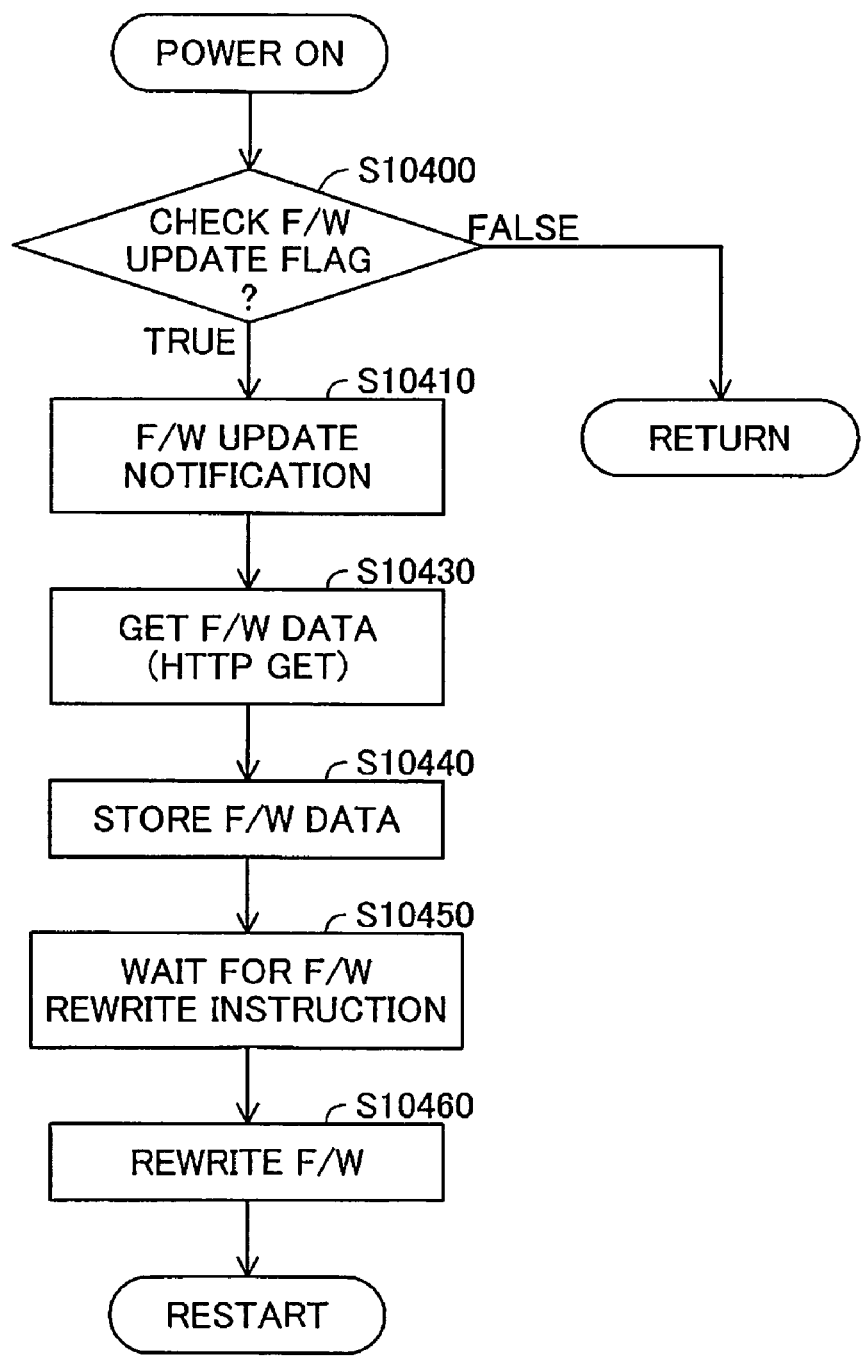
FIG. 31 is a flowchart showing the sequence of operations performed in a different example of the update processing in the power-synchronous update mode.

FIG. 31 is a flowchart showing the sequence of operations performed in a different example of the update processing executed during power-synchronous update mode. This sequence of operations differs from the corresponding sequence of operations executed in connection with the second embodiment shown in FIGS. 29 and 30 in that the firmware is rewritten when the power to the printer 10100 is turned ON. The network system configuration is identical to that of the network system 10010 of the first embodiment shown in FIG. 18. The firmware configuration is also identical to that of the firmware 10500*a* of the second embodiment shown in FIG. 18.

In the example of FIG. 20, the update module 530*a* sets the update flag to "TRUE" based on a flowchart identical to that shown in FIG. 29. In the fourth embodiment, the update flag is stored in the EPROM 10116 being a non-volatile memory. This is because that the update module 10530*a* uses the update flag after the power to the printer 10100 is stopped once and then resumed. The forth embodiment differs from the third embodiment shown in FIG. 30 in that the CPU 10112 causes the power supply controller 10122 to turn power OFF without rewriting the firmware even if the value of the update flag is "TRUE". Instead, the CPU 10112 executes firmware update processing in response to the value of the update flag when the power is turned ON next time.

FIG. 31 is a flowchart showing the sequence of operations carried out when power to the printer 10100 (shown in FIG. 19) is turned ON. The power supply controller 10122 turns ON power to the printer 10100 in response to the pressing of the power button (not shown) on the operation panel 10126 (shown in FIG. 19). In response to the turning ON of power, the CPU 10112 begins control based on the firmware 10500*a* (shown in FIG. 19) stored in the EPROM 10116. First, the update module 10530*a* begins the update processing shown in FIG. 31. In other words, the update module 10530*a* begins update processing in response to the receipt of a power ON instruction.

In the first step S10400, the update module 10530*a* (shown in FIG. 19) determines whether or not the update flag is "TRUE." If the update flag is "FALSE," the update module 10530*a* terminates update processing. The CPU 10112 then begins print servicing (receipt of print requests) based on the firmware stored in the EPROM 10116.

If the update flag is "TRUE", the CPU 10112 executes the operations of step S10410 and steps S10430~S10460. The operations of these steps S10410, S10430~S10460 are identical to the operations of the steps S10310, S10330~S10360 shown in FIG. 30. When writing of the updater firmware is completed, the CPU 10112 begins print servicing (receipt of print requests) based on the updater firmware stored in the EPROM 10116.

In the fourth embodiment, where the update module 10530*a* receives a firmware update request (with the operation of the third button B23 shown in FIG. 22), the update module 10530*a* begins update processing in response to a power ON request received after the power to the printer 10100 has been terminated, as described above (see FIG. 31).

Because the firmware is updated when power to the printer 10100 is turned ON as described above, the problem that print servicing is stopped in order to permit the firmware to be updated and printing cannot be performed can be avoided.

E. Fifth Embodiment

Figure 32:
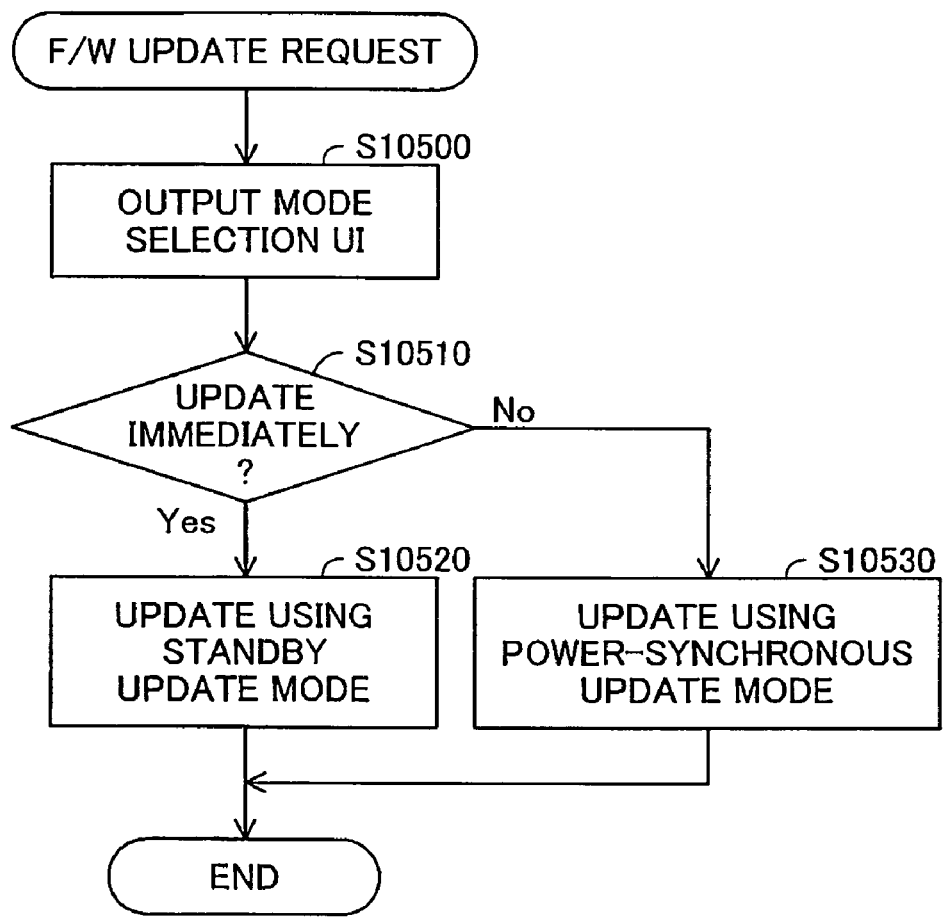
FIG. 32 is a flowchart showing the sequence of operations of a firmware update process of a fifth embodiment.

FIG. 32 is a flowchart showing the sequence of operations of a firmware update process of a fifth embodiment. This process differs from the corresponding process of the above embodiments in that the firmware update processing mode is determined based on user instruction. In the fifth embodiment, the update module 10530a can execute firmware update processing based on either the standby update mode shown in FIG. 25 or on the power-synchronous update mode shown in FIGS. 29 and 30. In addition, the update module 10530a allows the user to select an update mode.

Figure 33:
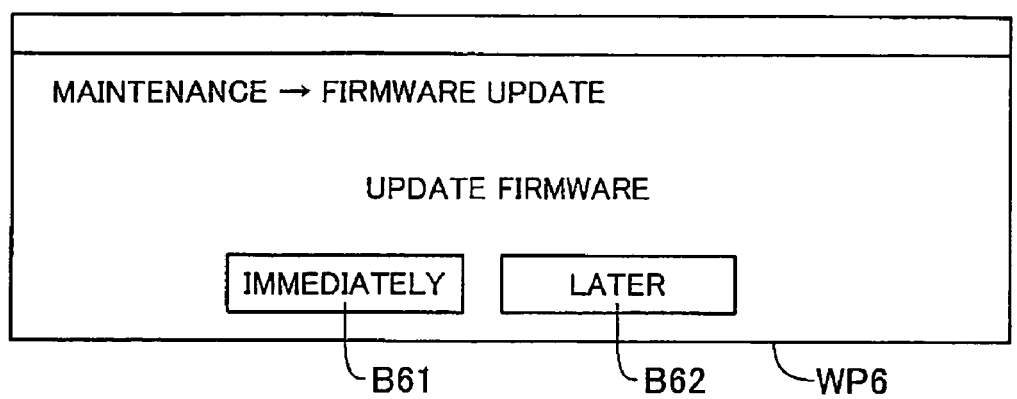
FIG. 33 is an explanatory drawing of an example of the Web page output in step S10500.

The update module 10530a begins the processing shown in FIG. 32 in response to user operation of the third button B23 (shown in FIG. 22) used for firmware updating. In the first step S10500, the update module 10530a causes the HTTP server module 10520a to output a Web page (user interface) that allows the user to input an instruction selecting an update mode. FIG. 33 is an explanatory drawing of an example of the Web page output in step S10500. This Web page WP6 has a "Immediately" button B61 and a "Later" button B62.

In the next step S10510, the update module 10530a determines whether or not the user has operated either of the two buttons B61, B62. If the "Immediately" button B61 has been operated, the update module 10530a proceeds to step S10520 and initiates update processing using the standby update mode (shown in FIG. 25). If the "Later" button B62 has been operated, the update module 10530a advances to step S10530 and initiates update processing using the power-synchronous update mode (shown in FIGS. 29 and 30). The processing executed in the third embodiment shown in FIG. 31 may be used as the update processing performed in power-synchronous update mode.

As described above, in the fifth embodiment, the user can select a desired update mode from between the standby update mode in which the firmware is updated immediately after all print jobs are completed and power-synchronous update mode in which the firmware is updated when the power ON/OFF state is changed. As a result, in the fifth embodiment, the firmware can be updated when appropriate in either the case where immediate updating of the firmware is desired or the case where it is desired that there be no interruption in the execution of pending print jobs.

F. Variations

The present invention is not limited to the above embodiments, and may be implemented in various ways within its essential scope. The variations described below are possible, for example.

F1. Variation 1

In the first embodiment hereinabove, the device unit 400 enters a state that reception of a request for processing other than firmware update request is prohibited during step [CF3] shown in FIG. 9 in which the device unit 400 replies to the initial GET request for the firmware update page. This state is entered at a different time also. The processing request-acceptable state may be changed at a prescribed time during the firmware update sequence, such as during step [WN1] in FIG. 15 in which firmware updating of the network unit 300 is started, or during step [WD1] in FIG. 17 in which a stop command is sent to the network unit 300.

F2. Variation 2

In the first embodiment hereinabove, an instruction related to MFP 200 firmware update processing is supplied from a user-operated digital television 110 (shown in FIG. 1), but the update processing-related instruction may by supplied by a different method. The firmware update processing-related instruction may be supplied by the operation panel controller 490 (shown in FIG. 2) in response to user operation of the operation panel 492 (shown in FIG. 2), or by a personal computer PC connected to the second USB device controller 472 (shown in FIG. 2) in response to user operation of the personal computer PC. In this case, the user interfaces UI1~UI5 (shown in FIGS. 8, 12) that notify the status of the MFP 200 to the user and by which a user instruction is received are displayed in the viewer 502 (shown in FIG. 2) or on the screen of the personal computer PC.

When a firmware update processing-related instruction is sent by the personal computer PC which is connected to the second USB device controller 472, the personal computer PC may provide the firmware data for updating to the MFP 200. In this case, the steps of obtaining the user instruction (see FIGS. 9, 10), notifying the user (FIG. 11) and transferring the firmware data (see FIGS. 14, 16) are performed using the second USB device controller 472 rather than the first USB device controller 460, which are both USB device controllers. Therefore, the MFP 200 can update the firmware by executing the same processes (protocols) as in the above embodiment simply by changing the device controller to be used. In addition, when sending the firmware data from the personal computer PC to the MFP 200, data obtained by the personal computer PC via the LAN may be transferred sequentially, or data stored in advance in a recording medium installed in the personal computer PC may be transferred.

F3. Variation 3

In the first embodiment hereinabove, the firmware updating method of the present invention was applied to an MFP 200 (shown in FIG. 2). The firmware updating method may be applied to a different network apparatus. In general, the present invention may be applied in a network apparatus that includes multiple controllers interconnected via communication channels and that is connected to a network through at least one of these multiple controllers. The present invention may be applied either to a stand-alone network apparatus that can provide services, such as a network printer or network scanner, or to a network apparatus that is connected to a device lacking network processing functions and that provides the services of such device to the LAN as services (such as a UPnP bridge).

F4. Variation 4

In the second through fifth embodiments hereinabove, it is acceptable if the update module 10530a initiates rewriting of the firmware in the EPROM 10116 after the updater firmware is completely obtained, regardless of whether or not a firmware rewrite instruction has been issued. For example, step S10250 may be omitted from the sequence of operations shown in FIG. 25. Similarly, step S10350 may be omitted from the sequence of operations shown in FIG. 30, and step S10450 may be omitted from the sequence of operations shown in FIG. 31. Furthermore, in lieu of these omitted operations, the update module 10530a can ask the user once more after the updater firmware has been completely obtained whether or not updating is desired.

F5. Variation 5

It is acceptable if in the update processing executed in the power-synchronous update mode shown in FIGS. 29 and 30, the update flag is set without checking whether or not newer firmware exists. For example, steps S10220 and S10235 shown FIG. 29 may be omitted. However, in this case, it is preferred that the update module 10530a check whether or not newer firmware exists when the firmware is obtained from the server 10400. For example, the update module 10530a can execute the operation of step S10220 shown in FIG. 29 between the operations of steps S10300 and S10310 shown in FIG. 30. Here, if updating is possible, the update module 10530a proceeds to step S10310. On the other hand, if updating is not possible, the update module 10530a proceeds to step S10320. In this case, the update module 10530a executes the same processing as that carried out in step S10235 shown in FIG. 29.

The variations described above can be applied to the update processing shown in FIG. 31 as well. In this case, it is preferred that the update module 10530a check for the existence of newer firmware between the operations of steps S10400 and S10410 shown in FIG. 31.

F6. Variation 6

It is acceptable if in the embodiment shown in FIG. 25, where multiple print requests have been received, the update module 10530a executes firmware rewrite processing before one or more of the print request-related print jobs are executed. For example, after the print job in progress is completed, the update module 10530a suspends processing of the other print jobs and executes firmware rewrite processing in response to the receipt of a firmware rewrite request. In this case, after the firmware is updated, the updated print module executes the print jobs that had been suspended, based on the print requests in the RAM 10114.

In general, for the sequence of operations executed in standby update mode, any desired sequence of operations may be used that updates the firmware used for control of the print engine 10190 while print jobs are not executed, in response to the completion of the print job in progress when the update request is received. In other words, any sequence of operations may be employed that suspends the commencement of control using the new firmware and begins such control when no print jobs are performed and the print job that was underway when the update request was received has been completed. However, it is preferred that a sequence of operations be adopted in which the receipt of new print requests is suspended and the rewriting of the firmware is performed only after all print jobs generated from received print requests have been completed, as in the embodiment shown in FIG. 25. In this case, printing problems attributable to conflicts between the updated firmware and pending print requests can be prevented.

F7. Variation 7

During update processing executed in power-synchronous update mode, the update module 10530a may obtain the updater firmware at any given time. For example, in the embodiment shown in FIGS. 29 and 30 the update module 10530a can obtain the updater firmware before a power-OFF instruction is received following receipt of a firmware update request. Specifically, the update module 10530a can execute the operations of steps S10330, S10340 shown in FIG. 30 at any time between steps S10220 and S10280 shown in FIG. 29, or after step S10280, regardless of whether a power-OFF instruction has been issued.

The variations described above can be applied to the update processing shown in FIG. 31 as well. It is acceptable even if firmware is rewritten when the power is turned ON, as in the embodiment shown in FIG. 31, the update module 10530a alternatively obtains the updater firmware prior to this, i.e., when the power is turned OFF. However, in this case, the updater firmware is stored in a non-volatile memory (such as the EPROM 10116).

In general, the sequence of operations executed in power-synchronous update mode may include any sequence of operations in which the firmware used for control of the print engine 10190 is updated in response to the receipt of a request to switch the power ON/OFF state of the controller 10110. In other words, any sequence of operations may be employed that suspends the commencement of control using the new firmware and begins the control with the new firmware in response to the receipt of a request to switch the power ON/OFF state of the controller 10110. Here, where the firmware is rewritten when the power is turned OFF, it is preferred that such rewriting takes place after printing of all received print requests has been completed.

F8. Variation 8

In the second through fifth embodiments hereinabove, it is acceptable if the firmware stored in the EPROM 10116 is only partially updated. For example, it is acceptable if only the print module 10510a is updated, without the modules that have the function of executing firmware update processing (the HTTP server module 10520a and the update module 10530a). In this case, the CPU 10112 can execute update processing without the computer program executed by the CPU 10112 switching from the firmware in the EPROM 10116 to the firmware in the RAM 10114. In such event, it is acceptable if the CPU 10112 writes the updater print module obtained from the server 10400 directly to the EPROM 10116 without storing it first in the RAM 10114.

F9. Variation 9

In the second through fifth embodiments hereinabove, any desired process that controls the print engine 10190 may be used as the process executed by the controller 10110 based on the updatable firmware. For example, such process may consist only of image processing such as color conversion or halftone processing, or only of the process of determining the print job execution schedule for multiple print jobs.

F10. Variation 10

In the second through fifth embodiments hereinabove, it is acceptable if the power supply to the print engine 10190 (shown in FIG. 18) is controlled independently from the power supply to the controller 10110. For example, it is acceptable if the power supply controller 10122 controls the power ON/OFF state of the controller 10110 only without controlling the power ON/OFF state of the print engine 10190. In both cases, it is preferred that in power-synchronous update mode, the firmware be updated when the power ON/FF state of the controller 10110 is changed. Such a configuration prevents the suspension of the control of the print engine 10190 by the controller 10110 due to firmware update processing.

F11. Variation 11

In the second through fifth embodiments hereinabove, the CPU 10112 executes a computer program after reading it directly from the EPROM 10116. Alternatively, the CPU 10112 may also execute a computer program read from the RAM 10114 after all of the firmware is stored in the RAM 10114. In addition, in this case, the updater print module obtained from the server 10400 may be written directly to the EPROM 10116 without storing in the RAM 10114 at first.

F12. Variation 12

In the second through fifth embodiments hereinabove, the update module 10530a (shown in FIG. 19) receives various user instructions via a Web page, but various other methods for receiving instructions may be applicable. For example, the update module 10530a may receive various instructions with the operation panel 10126. In this case, the update module 10530a (shown in FIG. 19) displays screens similar to the Web pages on the display screen (not shown) of the operation panel 10126 by controlling the operation panel controller 10124.

F13. Variation 13

In the second through fifth embodiments hereinabove, the configuration of the printer 10100 is not limited to the configuration shown in FIG. 18, and any of various other configurations may be applicable. For example, the external device controller 10118 may be omitted. In this case, the printer 10100 receives print requests via the network controller 10120 (IAN). Alternatively, print requests may be received via only the external device controller 10118. Further more, both of the operation panel controller 10124 and operation panel 10126 may be omitted.

F14. Variation 14

In the second through fifth embodiments hereinabove, a part of the configuration realized by hardware may be implemented by software, or conversely, a part of the configuration implemented by software may be realized by hardware. For example, the functions of the modules that execute firmware update processing (such as the HTTP server module 10520a and the update module 10530a shown in FIG. 19) may be realized by a hardware circuit incorporating a logical circuit.

Where some or all of the functions of the present invention are implemented by software, this software may be provided as a computer-readable recording medium on which the computer program is recorded. In the present invention, a "computer-readable recording medium" is not limited to a portable recording medium such as a flexible disk or a CD-ROM, but includes an internal storage device installed in a computer, such as any of various types of RAM or ROM, or an external storage device settled in a computer, such a hard disk drive.

F15. Variation 15

The update processing of the second through fifth embodiments hereinabove is applied to the update of the firmware 10500a used by the CPU10112 for performing the print processing. This update processing is also applicable to the update processing of the firmware of the MFP 200 (shown in FIG. 2) of the first embodiment which has firmware used by the CPU310 besides the CPU410 for performing the print processing. In this case, since the function of the network unit 300 may halt by the switching of the firmware executed by the CPU310 to the updated firmware, it is preferable that the firmware is switched after timing when the predetermined condition is satisfied as in the second through the fifth embodiments.

In the first embodiment, the firmware of the network unit 300 is switched when the power of the MFP 200 is turned ON subsequent to the turn OFF in the step [WD11] shown in FIG. 17. It is also available to switch the firmware according to other timing. In general, the firmware of the network unit 300 may be switched in any timing after the step [WN6] shown in FIG. 15 when the communication between the network and the MFP200 is not performed. In this case, the firmware of the network unit 300 can be switched by the device unit 400 sending the instruction for rebooting to the network unit 300, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control software update method for updating control software for a network apparatus having a first controller and a second controller that are coupled via a communication channel, wherein the first controller performs control with first control software, the second controller performs control with second control software, and the network apparatus is coupled to a network via the first controller, the control software update method comprising the steps of:
    (a) at the first controller, obtaining first control software update data for updating the first control software via the network and transferring the obtained first control software update data to the second controller via the communication channels;
    (b) at the second controller, storing the first control software update data transferred from the first controller in a storage device in the second controller;
    (c) after the entirety of the first control software update data is stored in the storage device by the second controller, transferring the first control software update data to the first controller via the communication channel; and
    (d) at the first controller, updating the first control software with the first control software update data transferred from the second controller; wherein
    the transferring of step (c) and the updating of step (d) are executed in parallel at the second controller and the first controller;
    (e) at the first controller, obtaining via the network second control software update data for updating the second control software and sending the obtained second control software update data to the second controller via the communication channels;
    (f) at the second controller, storing the second control software update data transferred from the first controller in the storage device in the second controller; and
    (g) after the entirety of the second control software update data is stored in the storage device by the second controller, updating the second control software with the second control software update data stored in the storage device.

2. A control software update method according to claim 1, wherein an update data server that can supply the first control software update data in response to a request from a client which is coupled to the network, and the step (a) includes the steps of:
    at the first controller, sending a plurality of messages to the update data server via the network for requesting the update server to supply the entirety of the first control software update data in a plurality of sessions;
    at the first controller, obtaining the first control software update data supplied from the update data server in response to the plurality of messages; and
    at the first controller, sequentially sending the first control software update data supplied from the update data server to the second controller without waiting until the entirety of the first control software update data is obtained.

3. A control software update method according to claim 2 wherein maximum free area of the storage device of the first controller in operation is smaller than size of the entirety of the first control software update data.

4. A control software update method according to claim 1, wherein the network apparatus is compatible with Universal Plug and Play,
the method further comprising the step of
on or after a predetermined timing in sequence of the control software update, causing the second controller to enter a state wherein requests for processing other than updating of the control software are not accepted.

5. A control software update method according to claims 1, further comprising the steps of:
(h) at the second controller, starting the updating of the control software in accordance with update request of the control software
(i) after timing when a predetermined condition is satisfied, the second controller switches executing control software to be executed to the updated control software.

6. A control software update method according to claim 5 wherein the second controller is configured to perform printing control with the control software whereby the second controller receives printing request and causes a printing execution unit to execute printing in accordance with the printing request, and the second controller has, as an execution mode of the step (i), a standby switching mode wherein the second controller switches the executing control software to the updated control software while the printing control is not being performed, in response to the completion of printing control underway when the update request is received.

7. A control software update method according to claim 6 further comprising the step of the second controller in the standby switching mode halting receipt of a new print request in response to receipt of the update request.

8. A control software update method according to claim 6 wherein the second controller is configured to control ON/OFF state of a power supply of the network apparatus and has as an execution mode of the step (i) a power-synchronous switching mode wherein the second controller switches the executing control software to the updated control software in response to a request for changing the ON/OFF state,
the method further comprising the step of acquiring an instruction from user to select one of the standby switching mode and the power-synchronous switching mode.

9. A control software update method according to claims 8 wherein the step (i) includes the step of the second controller in the power-synchronous update mode switching the executing control software to the updated control software before the ON/OFF state is changed to a OFF state, in response to the receipt of a request to change the ON/OFF state to the OFF state.

10. A control software update method according to claims 8 wherein the step (i) includes the step of the second controller in the power-synchronous update mode switching the executing control software to the updated control software in response to the receipt of a request to change the ON/OFF state to a ON state, succeeding to change of the ON/OFF state to a OFF state in response to a request to change the ON/OFF state to the OFF state which is receipt after the reception of the update request.

11. A control software update method according to claim 5 wherein the second controller is configured to control ON/OFF state of a power supply of the network apparatus and has as an execution mode of the step (i) a power-synchronous switching mode wherein the second controller switches the executing control software to the updated control software in response to a request for changing the ON/OFF state.

12. A control software update method according to claim 11 wherein the step (i) includes the step of the second controller in the power-synchronous update mode switching the executing control software to the updated control software before the ON/OFF state is changed to a OFF state, in response to the receipt of a request to change the ON/OFF state to the OFF state.

13. A control software update method according to claim 11 wherein the step (i) includes the step of the second controller in the power-synchronous update mode switching the executing control software to the updated control software in response to the receipt of a request to change the ON/OFF state to a ON state, succeeding to change of the ON/OFF state to a OFF state in response to a request to change the ON/OFF state to the OFF state which is receipt after the reception of the update request.

14. A network apparatus comprising;
a first controller performs control with first control software and provides connection to a network;
a second controller performs control with second control software; and
a communication channel that couples the first controller and the second controller, wherein the second controller includes:
a storage device configured to be able to store first control software update data for updating the first control software;
an update data storing unit configured to stores into the storage device the first control software update data which is obtained by the first controller via the network and is transferred to the second controller via the communication channel; and
an update data transfer unit configured to transfer the first control software update data to the first controller via the communication channel, after the entirety of the first control software update data is stored in the storage device, and
the first controller configured to update the first control software with the first control software update data transferred from the second controller;
at the first controller, obtaining via the network second control software update data for updating the second control software and sending the obtained second control software update data to the second controller via the communication channels;
at the second controller, storing the second control software update data transferred from the first controller in the storage device in the second controller; and
after the entirety of the second control software update data is stored in the storage device by the second controller, updating the second control software with the second control software update data stored in the storage device.

15. A computer program product for updating control software for a network apparatus having a first computer and a second computer that are coupled via a communication channel, wherein the first computer performs control with first control software, the second computer performs control with second control software, and the network apparatus is coupled to a network via the first computer, the computer program product comprising:
a computer-readable storage medium; and
a computer program stored on the computer-readable storage medium, the computer program includes:
a first computer program for causing the first computer to obtain first control software update data for updating the first control software via the network and to transfer the obtained first control software update data to the second computer via the communication channels;

a second computer program for causing the second computer to store the first control software update data transferred from the first computer in a storage device in the second computer;

a third computer program for causing the second computer to transfer the first control software update data to the first computer via the communication channel, after the entirety of the first control software update data is stored in the storage device; and a fourth computer program for causing the first computer to update the first control software with the first control software update data transferred from the second computer;

at the first controller, obtaining via the network second control software update data for updating the second control software and sending the obtained second control software update data to the second controller via the communication channels;

at the second controller, storing the second control software update data transferred from the first controller in the storage device in the second controller; and after the entirety of the second control software update data is stored in the storage device by the second controller, updating the second control software with the second control software update data stored in the storage device.

16. A control device for controlling a printing execution unit that executes printing comprising:

a controller that has a storage device, the controller controlling the printing execution unit with control software stored in the storage device; and a network interface that is coupled to a network and enables communication to a server providing updater control software over the network, wherein the controller executes update processing in response to a request for updating of the control software, the update processing including:

a process to obtain the updater control software from the server via the network interface; and a process to suspend the updating of the control software and to update the control software used for the control to the updater control software when a predetermined condition is satisfied;

at the first controller, obtaining via the network second control software update data for updating the second control software and sending the obtained second control software update data to the second controller via the communication channels;

at the second controller, storing the second control software update data transferred from the first controller in the storage device in the second controller; and after the entirety of the second control software update data is stored in the storage device by the second controller, updating the second control software with the second control software update data stored in the storage device.

17. A printer system having the control device according to claims 16 and the printing execution unit.

18. A method for updating control software used for control performed by a control device controlling a printing execution unit that executes printing, the control device has a storage device, the control device controlling controls the printing execution unit with control software stored in the storage device, the control device coupled to a network and being able to communicate over the network with a server providing updater control software, the method being executed in response to a request to update the control software comprising the steps of:

(A) obtaining the updater control software from the server by the control device; and (B) suspending the updating of the control software used for the control by the control device and updating the control software to the updater control software when a predetermined condition is satisfied; at the first controller, obtaining via the network second control software update data for updating the second control software and sending the obtained second control software update data to the second controller via the communication channels;

at the second controller, storing the second control software update data transferred from the first controller in the storage device in the second controller; and after the entirety of the second control software update data is stored in the storage device by the second controller, updating the second control software with the second control software update data stored in the storage device.

19. A computer program product for causing update processing of control software used by a computer controlling a printing execution unit that executes printing, the computer program product comprising:

a computer-readable storage medium; and a computer program stored on the computer-readable storage medium, wherein the computer is coupled to a network and is able to communicate over the network with a server providing updater control software, and the computer program causing the computer to execute the update processing in response to a request to update the control software, the computer program including:

a first computer program causing the computer to obtain the updater control software from the server; and a second computer program causing the computer to suspend the updating of the control software used for the control and to update the control software to the updater control software when a predetermined condition is satisfied;

at the first controller, obtaining via the network second control software update data for updating the second control software and sending the obtained second control software update data to the second controller via the communication channels;

at the second controller, storing the second control software update data transferred from the first controller in the storage device in the second controller; and after the entirety of the second control software update data is stored in the storage device by the second controller, updating the second control software with the second control software update data stored in the storage device.

* * * * *